(12) United States Patent
Dietrich

(10) Patent No.: US 6,428,113 B2
(45) Date of Patent: Aug. 6, 2002

(54) CYCLE AND TENSIONED SPOKED WHEEL ASSEMBLY

(76) Inventor: Rolf Dietrich, 4631 Shadowood La., Toledo, OH (US) 43614-3051

(*) Notice: Subject to any disclaimer, the term of this patent is extended or adjusted under 35 U.S.C. 154(b) by 0 days.

(21) Appl. No.: 09/924,790

(22) Filed: Aug. 8, 2001

Related U.S. Application Data

(63) Continuation-in-part of application No. 09/365,957, filed on Aug. 2, 1999, now abandoned, which is a continuation of application No. 09/130,142, filed on Aug. 6, 1998, now Pat. No. 5,931,544, which is a continuation of application No. 08/893,902, filed on Jul. 11, 1997, now abandoned, which is a continuation of application No. 08/520,536, filed on Aug. 28, 1995, now abandoned, which is a continuation-in-part of application No. 08/049,504, filed on Apr. 19, 1993, now Pat. No. 5,445,439, which is a continuation-in-part of application No. 07/813,436, filed on Dec. 24, 1991, now abandoned.

(51) Int. Cl.$^7$ ................................................. B60B 1/02
(52) U.S. Cl. ............................. 301/59; 301/55; 301/58
(58) Field of Search ............................. 301/55, 58, 59, 301/61, 95, 104

(56) References Cited

U.S. PATENT DOCUMENTS

| | | | | |
|---|---|---|---|---|
| 365,091 | A | * 6/1887 | Owen | 301/58 X |
| 436,993 | A | 9/1890 | Overman | |

(List continued on next page.)

FOREIGN PATENT DOCUMENTS

| | | | |
|---|---|---|---|
| DE | 398372 | * | 1/1923 |
| DE | 583902 | * | 8/1933 |
| DE | 155602 | * | 6/1982 |
| FR | 425730 | * | 6/1911 |
| FR | 874167 | * | 7/1942 |
| FR | 1019285 | * | 1/1953 |
| FR | 2378642 | * | 9/1978 |
| GB | 16340 | * | 1/1886 |
| GB | 3056 | | 2/1889 |
| GB | 5968 | | 4/1890 |
| GB | 4449 | * | 3/1894 |
| GB | 13973 | * | 6/1896 |
| GB | 22441 | * | 9/1897 |
| GB | 19499 | * | 1/1899 |
| GB | 9844 | * | 1/1910 |
| GB | 854546 | * | 11/1960 |
| JP | 77302 | * | 3/1990 |

OTHER PUBLICATIONS

Bicycling, Apr. 1992, p. 152.*
Bicycling, Apr. 1993, pp. 120 and 122.*
Brandt, Jobst; The Bicycle Wheel (3rd Edition) cover page and page 76.

* cited by examiner

Primary Examiner—Russell D. Stormer
(74) Attorney, Agent, or Firm—David C. Purdue; John C. Purdue

(57) ABSTRACT

A low spoke count high spoke tension bicycle wheel having paired spokes that cross between the hub and the rim is disclosed. The wheel has a center plane and comprises a bicycle wheel hub having first and second hub flanges on first and second sides, respectively, of the wheel center plane, a rim, and nine or fewer pairs of first and second spokes each having a first end which is connected to one of said hub flanges or to said rim and a second end which is threadably received in a nipple which is seated at a spoke bore in said rim or in said hub. The wheel has excellent lateral stiffness which gives a bike on which the wheel is mounted excellent resistance to speed wobble or shimmy, in the case of a front wheel or to axle deflection, in the case of a rear wheel, and the spokes in the pair cross the wheel center plane between the hub and the rim, for added lateral strength. The first and second spokes of each pair are not connected to each other and have a combined static tension in excess of 200 pounds.

5 Claims, 16 Drawing Sheets

U.S. PATENT DOCUMENTS

| | | | | |
|---|---|---|---|---|
| 582,486 A | * | 5/1897 | Rowe | 301/61 |
| 1,064,066 A | * | 6/1913 | Funk | 301/96 |
| 1,160,203 A | * | 11/1915 | Wagonhorst | 301/56 |
| 1,476,780 A | * | 12/1923 | Van Meter | 301/56 |
| 1,795,574 A | * | 3/1931 | Olson | 301/55 X |
| 2,937,905 A | * | 5/1960 | Altenburger | 301/58 |
| 3,008,770 A | * | 11/1961 | Mueller | 301/58 X |
| 4,300,804 A | * | 11/1981 | Hasebe | 301/56 X |
| 4,583,787 A | * | 4/1986 | Michelotti | 301/58 |
| 4,626,036 A | * | 12/1986 | Hinsberg et al. | 301/59 |
| 4,682,821 A | | 7/1987 | Strazis | |
| 4,729,605 A | * | 3/1988 | Imao et al. | 301/104 |
| 4,844,552 A | * | 7/1989 | Tsygankov et al. | 301/64.2 |
| 5,061,013 A | * | 10/1991 | Hed et al. | 301/63 |
| 5,104,199 A | * | 4/1992 | Schlanger | 301/64.2 |
| 5,445,439 A | * | 8/1995 | Dietrich | 301/55 |
| 5,931,544 A | * | 8/1999 | Dietrcih | 301/58 |

* cited by examiner

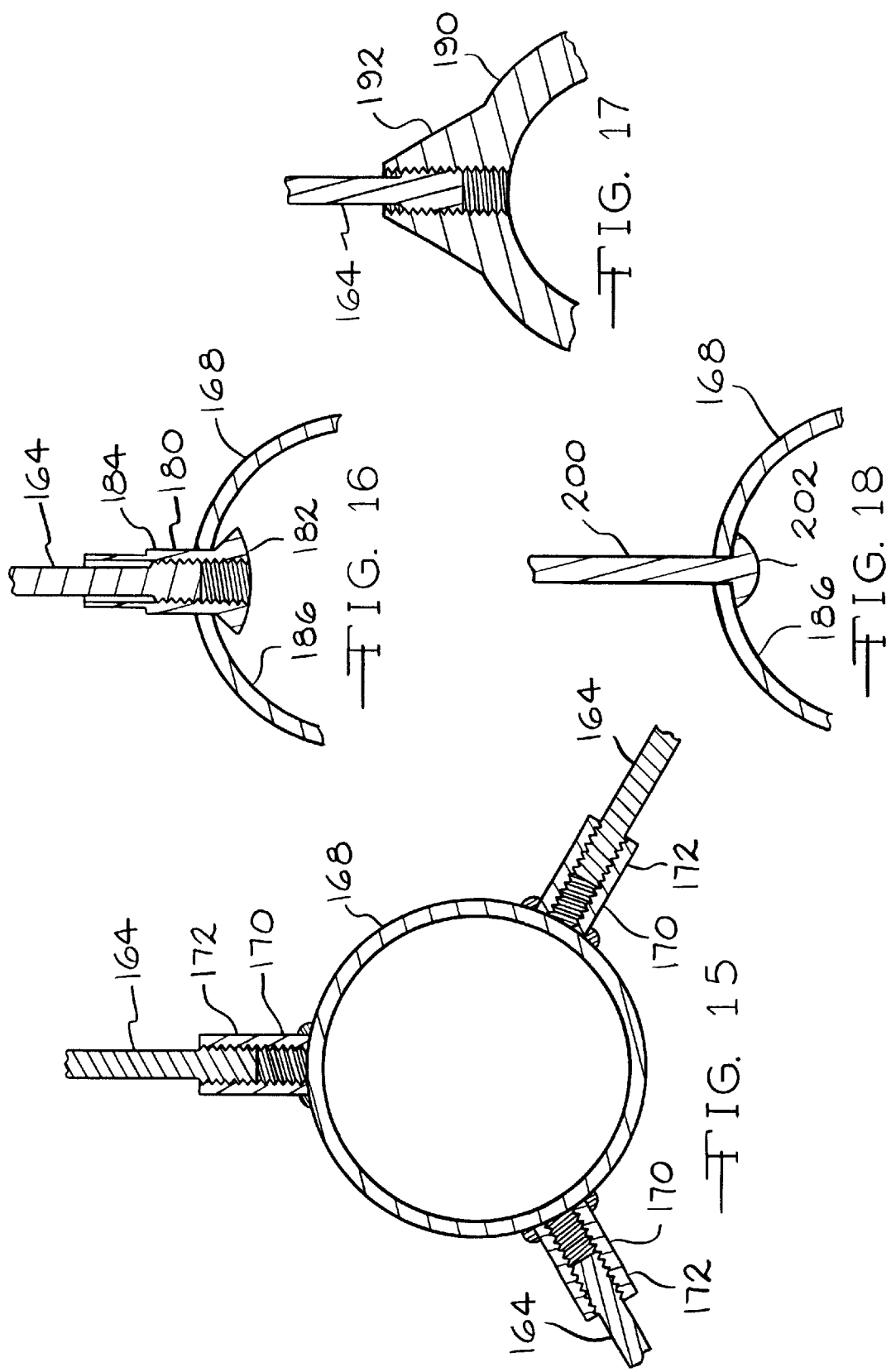

CYCLE AND TENSIONED SPOKED WHEEL ASSEMBLY

REFERENCE TO RELATED APPLICATION

This is a continuation-in-part of applicant's U.S. patent application Ser. No. 09/365,957, filed Aug. 2, 1999 now abandoned, which, in turn, was a continuation of applicant's U.S. patent application Ser. No. 09/130,142, filed Aug. 6, 1998, now, U.S. Pat. No. 5,931,544, which, in turn, was a continuation of applicant's U.S. patent application Ser. No. 08/893,902 filed Jul. 11, 1997, now abandoned, which, in turn, was a continuation of applicant's U.S. patent application Ser. No. 08/520,536 filed Aug. 28, 1995, now abandoned, which, in turn, was a continuation-in-part of applicant's U.S. patent application Ser. No. 08/049,504 filed Apr. 19, 1993, now U.S. Pat. No. 5,445,439, which, in turn, was a continuation-in-part of applicant's U.S. patent application Ser. No. 07/813,436 filed Dec. 24, 1991, now abandoned.

BACKGROUND OF THE INVENTION

1. Field of the Invention

The present invention relates generally to bicycles and spoked wheels therefor. More specifically, the invention relates to tensioned paired spoked wheels which are low in weight, low in spoke count, high in spoke tension, high in stability and especially suited for use on bicycles.

2. Description of the Prior Art

The art of tensioned spoked wheels is one which dates back well into the 1800's when such wheels were developed for the Highwheeler bicycles and Ordinaries of the 1880's. Prior to that time, compressively loaded spoked wheels were standard fare as evidenced by Roman chariot wheels, long ago, and, more recently, by the wheels of the Ford Model T automobile. An example of the compressively loaded spoked wheel in the context of a bicycle wheel is shown in U.S. Pat. No. 452,649 (Powell).

U.S. Pat. No. 339,550 (Hudson) discloses a tensioned spoked wheel assembly from the heyday of the Ordinaries. This patent is particularly concerned with the construction of a rim from tubing or sheet metal and includes a seam which is protected from the elements by being positioned under the tire. In cross section, this wheel assembly is illustrated as having a toroidal rim, which is wider than a tire mounted on it.

U.S. Pat. No. 5,061,013 (Hed et al.) discloses a bicycle wheel with good aerodynamic properties. The wheel has a toroidal rim with a high aspect ratio and a width exceeding the width of a tire to be mounted on it. FIG. 4 of the patent illustrates a wheel with 14 spokes. This is a reduced spoke count wheel in the sense that modern mass-produced bicycle wheels typically have 32 to 48 spokes. This is a conventionally spoked wheel in the sense that the outer ends of the fourteen spokes are connected to the rim at 14 points, which are evenly spaced about the circumference of the rim. The inner ends of the fourteen spokes are connected to the hub with seven spokes on each side of the hub. The fourteen-spoke wheel illustrated in FIG. 4 of the patent is a conventional radial spoked wheel. It is worth noting that the United States Cycle Federation (USCF) enforces a sixteen-spoke minimum, per wheel, for bicycles involved in sanctioned, mass-start races. This type of spoking will be referred to herein as conventional spoking.

U.S. Pat. No. 2,937,905 (Altenburger) discloses a rim configuration with a novel spoke connection in which the spoke nipple rests upon a surface which is canted so that spoke forces are well distributed on the nipple seat portion of the rim.

U.S. Pat. No. 4,583,787 (Michelotti) discloses a nipple seat bushing which is slanted to achieve a better stress distribution. U.S. Pat. No. 4,729,605 (Imao et al.) discloses a spoke with a fiber reinforced central portion and two fittings, one at each end of the central portion.

U.S. Pat. No. 452,046 (Mather) discloses a wagon wheel having a paired spoking arrangement. The tension of the spokes in the Mather wheel cannot be adjusted independently of the tension in the other spokes.

U.S. Pat. No. 5,104,199 issued Apr. 14, 1992 (Schlanger) and discloses a composite wheel made from two wheel halves, each comprising a hub ring (26), a spoke web (29), "spokes" (42), (44), (46) and (48) and a circular member (64). The wheel halves are connected to a hub and to an annular rim to produce a wheel. Concerning the orientations of the spoke portions, the patent states:

> "Additionally, FIGS. 1 and 2 illustrate the spoke portions 42, 44, 46 and 48 of the left wheel half 16 as being oriented directly opposite the associated spoke portions 50, 52, 54 and 56 of the right wheel half. While this configuration minimizes the stress on the circular members 64 and 66, it is feasible to employ a staggered orientation between spoke portions 42, 44, 46 and 48 of the left wheel half 16 and associated spoke portions 50, 52, 54 and 56 of the right wheel half." (Column 4, lines 23–31)

French Patent No. 1,019,285 (Menet) discloses a cycle wheel and, like the Mather patent, is concerned with eliminating lateral torsional forces at the rim while increasing lateral rigidity of the rim. According to the patent, this is achieved with a paired spoking arrangement.

British Patent Specification No. 3056 (Lovelace I) discloses improvements in cycles and discloses a wheel in which "two spokes, that is to say, one from each end of the hub, meet at the same point in the rim as shewn clearly in FIG. 5, thus bringing the strain to bear equally upon the rim and avoiding the liability to buckle, which is attendant on the usual arrangement." The spokes are straight pull spokes with threaded ends, which are screwed into the flanges of the hub, and heads that engage the rim floor. Lovelace I discloses a rear wheel with 36 spokes and a front wheel with 28 spokes.

British Patent Specification No. 5968 (Lovelace II) discloses what are termed to be improvements on features disclosed in Lovelace I. Concerning the arrangement for attaching spokes to wheel rims, it is disclosed that there are "two holes in the rim one in front of the other and near together, but slightly on the skew, that is to say the holes are made in a line which is diagonal to the rim . . . " The patent specification goes on to disclose that "In this case three holes 18, 19 and 20 are pierced in the rim 21, in line with each other, the center hole being large enough to admit the head of the spoke v . . . a slot is then cut connecting the holes . . . "

U.S. Pat. No. 4,682,821 discloses a wheel with offset paired spoking in a twenty inch, fifty-six spoke wheel which behaves, for all intents and purposes, as a disk wheel behaves because of the large number of spokes and the small diameter of the wheel.

U.S. Pat. No. 436,993 issued Sep. 23, 1890 (Overman) and discloses a wheel in which the spokes can be paired or conventionally laced and the spokes cross the wheel center plane between the rim and the hub. In the paired construction, the spokes in a pair are tied where they cross. Overman does not disclose a low spoke count wheel.

Tests have shown that each spoke of a modern quality bicycle wheel has an elastic limit, or yield point, of +300 kg in tension, approximately 4 times static tension. Since this yield point exceeds the total rider-machine weight by a factor of approximately 3 for a 175 lb. rider and 25 lb. bicycle, builders have become more daring in lowering spoke count. The minimum acceptable spoke count for mass-start United States Cycle Federation sanctioned races is 16 for a tensioned wheel. Conventional tensioned wheels with spoke counts below this have poor structural characteristics and become dangerously unstable and endanger not only the individual user but also other ride-race participants. Specifically, these low spoke count conventional wheels induce a steering input under load which becomes proportionately larger with each additional spoke count reduction and exhibit varying friction at the wheel-tire road contact point at a lean angle in turns. Measurements show that on a conventional fourteen spoke radially laced front wheel, the wheel axle departs from the horizontal, alternately dipping on the left side by net 0.015 inches when a right spoke passes over the wheel-road contact point (RCP) and then dipping net 0.015 inches on the right side when the next spoke, a left spoke, passers over the RCP. These horizontal position changes of the axle are measured with a 150 lb load applied at the axle at wheel center through the bicycle fork and are measured from axle center at the fork dropouts to the RCP on a 700C conventional fourteen spoke radially laced front bicycle wheel. Measurements show that the distance from the axle at the right dropout to the RCP decrease by 0.010 inches under load compared to the no-load distance as a right spoke is centered over the RCP and the distance from the axle at the left dropout to the RCP decreases by 0.025 inches under load compared to the no-load distance as the same right spoke is centered over the RCP. These differential distance variations result in a net 0.015 inch departure of the axle from the horizontal at the fork dropouts and this departure alternates from a low left dropout with the passage of a right spoke over the RCP to a low right dropout with the passage of the next, a left spoke, over the RCP. The rider experiences these horizontal axle position changes as alternating left to right and right to left steering inputs at the handlebar with the steering bar experiencing a direction reversal with the passage of each spoke over the RCP as the wheel rotates under load. The fourteen-spoke wheel under discussion exhibits 14 such steering pulses per wheel revolution. With a higher spoke count conventional tensioned wheel these net axle departures from the horizontal become less and move to 0 for a solid wheel and these departures become more pronounced with a further reduced spoke count.

The amplitude and frequency of these steering vibrations are inversely proportional, the kinetic energy per cycle driving them being constant. As wheel rotation speed goes up, frequency goes up and amplitude goes down. As rotational speed goes down, amplitude goes up and frequency goes down. This tends to obscure the phenomenon to the inattentive rider. Energy is consumed by these vibrations, detracting from overall vehicle efficiency. As well, internal stresses are created in the wheel, which eventually lead to system failure even if the wheel is run on a glass-smooth surface for its life cycle. In addition, these vibrations at the steering bar limit the lean angle a cyclist can achieve in a high-speed turn, where a constant steering angle is essential for safety once a lean angle has been established. These conventional wheel-induced steering inputs make a constant steering angle impossible. These steering inputs can also be the source of hitherto unexplained wheel shimmy on high spoke count conventional wheels when a highly tensioned spoke lies next to a low tensioned spoke as characteristically happens at the wheel-rim seam. Almost all wheels exhibit a variation in spoke tension at this point in the wheel and the net differential dip at the front dropouts will be much greater than 0.015 inches if adjoining spoke tension departs significantly. This greater steering pulse can at certain speeds, in concert with fork and frame characteristics, vehicle load distribution and rider-induced frame flex, cause sudden, uncontrollable and extremely dangerous shimmy during high vehicle speed.

At the rear of the bicycle the low spoke count conventional wheel cannot exhibit axle departure from the horizontal as the position of the dropouts is fixed in space by the closed triangles formed by the seat stays, chain stays and seat tube, the dropouts being attached at the intersection of the seat and chain stays. Axle movement being thus restricted, the geometry of the conventional wheel, specifically the spoke pattern, pulls the rim out of the center plane of the wheel at the RCP under load. The conventional fourteen spoke radially laced front wheel was tested under a 150 lb load applied at the axle with the axle locked in fixture restricting any axle movement as it would be were it installed at the rear of a bicycle and the departure from the wheel center plane of the rim was measured at the RCP. During this test the RCP was free to move and the axle was fixed. The wheel exhibited a lateral departure of 0.100 inches out of its center plane away from the spoke centered over the RCP. That is, when a right spoke was centered over the RCP the rim was deflected to the left and when a left spoke was centered over the RCP the rim was deflected to the right. The RCP would thus describe a sine wave over the road surface with an amplitude of 0.200 inches; 0.100 inches on each side of the wheel center plane as successive alternate spokes pass over the RCP with the distance between adjoining right peak side departures measured along the vehicle center line of travel being equal to the distance between adjoining right spokes projected to the RCP. These lateral side-to-side deflections of the rim at the RCP of a loaded moving rear conventional wheel cause excess stress in the wheel and lead to early system failure, even if the wheel is always ridden on glass-smooth surfaces. Also, the forces deflecting the rim laterally consume energy and this again detracts from overall system efficiency. During high speed cornering these side-to-side deflections severely limit the lean angle because road contact friction is severely pulsed going from a minimum to a maximum and back with the passage of successive spokes over the RCP.

The differential up and down rocking of the front fork dropouts and the lateral rear rim deflection at the RCP in loaded dynamic conditions of conventionally spoked tensioned wheels are caused by the existence of a horizontal force gradient (considering the wheel center plane as vertically oriented) in the rim between the spoke-rim contact points. The force applied by each spoke at the rim can be resolved into horizontal and vertical components and a typical horizontal component is 23 lbs. Thus a left spoke tensioned to about 150 lbs (typical) pulls the rim to the left, out of the wheel center plane with a resolved force of about 23 lbs. The next spoke along the wheel rotation will be a right spoke and it pulls the rim to the right by about 23 lbs if uniform tension exists. In an unloaded conventional wheel these forces are in balance and the rim is centered in the wheel center plane, which lies halfway between the dropouts, and a force gradient perpendicular to the plane of the wheel exists from spoke to spoke along the rim. On a low spoke count conventional wheel the distance along the rim between spokes becomes greater going from about 2 inches on a conventional thirty six spoke 700C rim to 5.25 inches on a conventional fourteen spoke wheel of the same diameter. Thus as any given spoke passes over the RCP on a low spoke count conventional wheel the adjoining spokes, the one directly ahead and behind, carry relatively less of the load and remain relatively high in tension and since each of these directly adjoining spokes is of opposite orientation of the main load carrying spoke and since this main load carrying spoke is severely reduced in tension, no countervailing or a severely reduced countervailing force vector remains and thus no alternating force vector remains to balance the horizontal force vectors of the adjoining spokes. If a right spoke is positioned over the RCP and it is substantially unloaded in tension by the system load its horizontal force vector along with its vertical force vector is essentially reduced to a very low value and the adjoining spokes being both of left orientation pull the rim unopposed to the left. As the conventional bicycle wheel rolls along under load the next spoke to become unloaded by the system load will be a left spoke and the rim will be deflected to the right resulting in a zigzag trace of the RCP along the wheel line of travel if a print were left by the RCP on the pavement. With further reduction in spoke count in a conventional wheel the amplitude of the zigzag trace will increase and with a greater spoke count the zigzag trace will decline in amplitude, going to 0 for a solid wheel.

In order to reduce the weight of tensioned spoked wheels, wheel makers have looked to low spoke count wheels such as the fourteen spoke wheel disclosed in Hed et al. Such a construction, however, suffers from instability and the origin and consequences of this instability are discussed herein in great detail. In Hed et al., it is suggested that one can produce a reduced spoke count wheel with as few as eight spokes if one uses a rim that is stiff and strong enough. As explained herein, the need for a stiff rim in low spoke count, conventionally laced wheels arises because of a practical limitation on the minimum number of spokes that one can use in making a conventional tensioned spoked wheel. Specifically, in such wheels, there are certain side loads that are unresolved by the spokes and are resolved only in the rim. Resolution of these loads in the rim creates a steering input in front wheels. Generally speaking, as the number of spokes per wheel is reduced, the magnitude of these forces increases until a point is reached at which conventional rims simply can't hold up. One answer, suggested in Hed et al., is to use a stronger rim but this almost necessarily involves additional mass, however, and the goal of a reduced weight wheel is subverted in the process.

There remains a need for a reduced spoke count wheel that does not require a super strong rim. There is also a need, particularly in the context of reduced spoke count wheels, for improved stability with respect to lateral loading.

SUMMARY OF THE INVENTION

The present invention is based upon the discovery of a low spoke count, high spoke tension, paired spoke wheel especially suited for bicycles and the like. The instant invention is a low spoke count bicycle wheel having a center plane. The wheel comprises a bicycle wheel hub for supporting the wheel relative to an axle rotatably supported therein, a rim, and nine or fewer pairs of first and second spokes. The hub has first and second hub flanges axially displaced from one another, and on first and second sides, respectively, of the wheel center plane. Each of the spokes has a first end which is connected to one of the hub flanges or to the rim and a second end which is threadably received in a nipple which is seated at a spoke bore in the rim or in the hub, so that tension is applied by the first spokes between the first hub flange and a first plurality of points which are circumferentially spaced substantially evenly around the rim, and are located on the second side of the wheel center plane, and so that tension is applied by the second spokes between the second hub flange and a second plurality of points on the rim. Each of the second points is adjacent to an adjacent one of the first plurality of points, and is located on the first side of the wheel center plane. The first and second spokes of each pair have a combined static tension in excess of 200 pounds and are connected only to the hub and to the rim, and not to each other. Each of the nipples is operable to adjust the tension in the one of the spokes which is threaded thereinto, independently of any adjustment to the tension in another spoke.

The pairs of first and second points on the rim are sufficiently close to each other that, when the wheel is mounted on a bicycle, that bicycle will have improved resistance to speed shimmy or wobble or wheel induced steering inputs or axle deflection by comparison with that bicycle with a conventional wheel comprising a bicycle wheel hub having first and second hub flanges axially displaced from one another, each on the opposite side of the wheel center plane from the other, a rim and more than the given number of pairs of first and second spokes, each spoke having a first, end and a second, threaded end connected to one of the hub flanges and to the rim, so that tension is applied by the first spokes between the first hub flange and a first plurality of points which are circumferentially spaced substantially evenly around the rim and so that tension is applied by the second spokes between the second hub flange and a second plurality of points on the rim each of which is positioned halfway between adjacent first points. The wheel is remarkably lightweight and bicycles having a front wheel according to the invention are not susceptible to speed shimmy or wobble induced in the front end. Bicycles having a rear wheel according to the invention resist axle deflection and are remarkable stable.

Accordingly, it is an object of the invention to provide a tensioned spoked wheel with a spoke configuration which eliminates or reduces internal, unresolved lateral spoke force vectors in the rims associated with prior art wheels.

It is a further object of the present invention to advance the art of reduced spoke count wheels by providing a super low spoke count wheel with remarkable stability and a positive effect on the stability at high speeds of any bicycle on which it is mounted.

It is a further object of the invention to greatly reduce or eliminate unresolved lateral force vectors in rims as an internal source of dangerous steering inputs and/or lateral rim deflections.

It is a further object of the invention to provide a bicycle including a front wheel according to the invention wherein the bicycle has improved resistance to speed wobble or shimmy by comparison with a bicycle having a prior art front wheel.

It is a further object of this invention to provide a super low spoke count wheel in which the spokes in a pair cross the wheel center plane between the hub and the rim, so as to further enhance the lateral stability of the wheel at a given spoke tension.

These and other objects and advantages of the present invention will no doubt become apparent to those skilled in the art after having read this detailed description of the invention including the following description of the preferred embodiment, which is illustrated by the various drawing figures.

BRIEF DESCRIPTION OF THE DRAWINGS

FIG. 15 is a cross sectional view, taken along the line 15—15 of FIG. 13, showing details of an embodiment of the hub.

FIG. 16 is a partial, cross-sectional view of an alternative embodiment of a hub showing hub and spoke connections in a wheel according to the present invention.

FIG. 17 is a partial, cross-sectional view of a second alternative embodiment of a hub showing hub and spoke connections in a wheel according to the present invention.

FIG. 18 is a partial, cross-sectional view of a third alternative embodiment of a hub showing hub and spoke connections in a wheel according to the present invention.

DETAILED DESCRIPTION OF THE PREFERRED EMBODIMENT

In the following detailed description, with reference to FIGS. 1 through 12, perfect paired spoking and crossed paired spoking in the context of bicycle wheels, both radially and tangentially spoked, are discussed in detail. Crossed paired spoking is an integral part of the presently claimed invention, which is described in further detail below with reference to FIG. 6.

Figure 1:
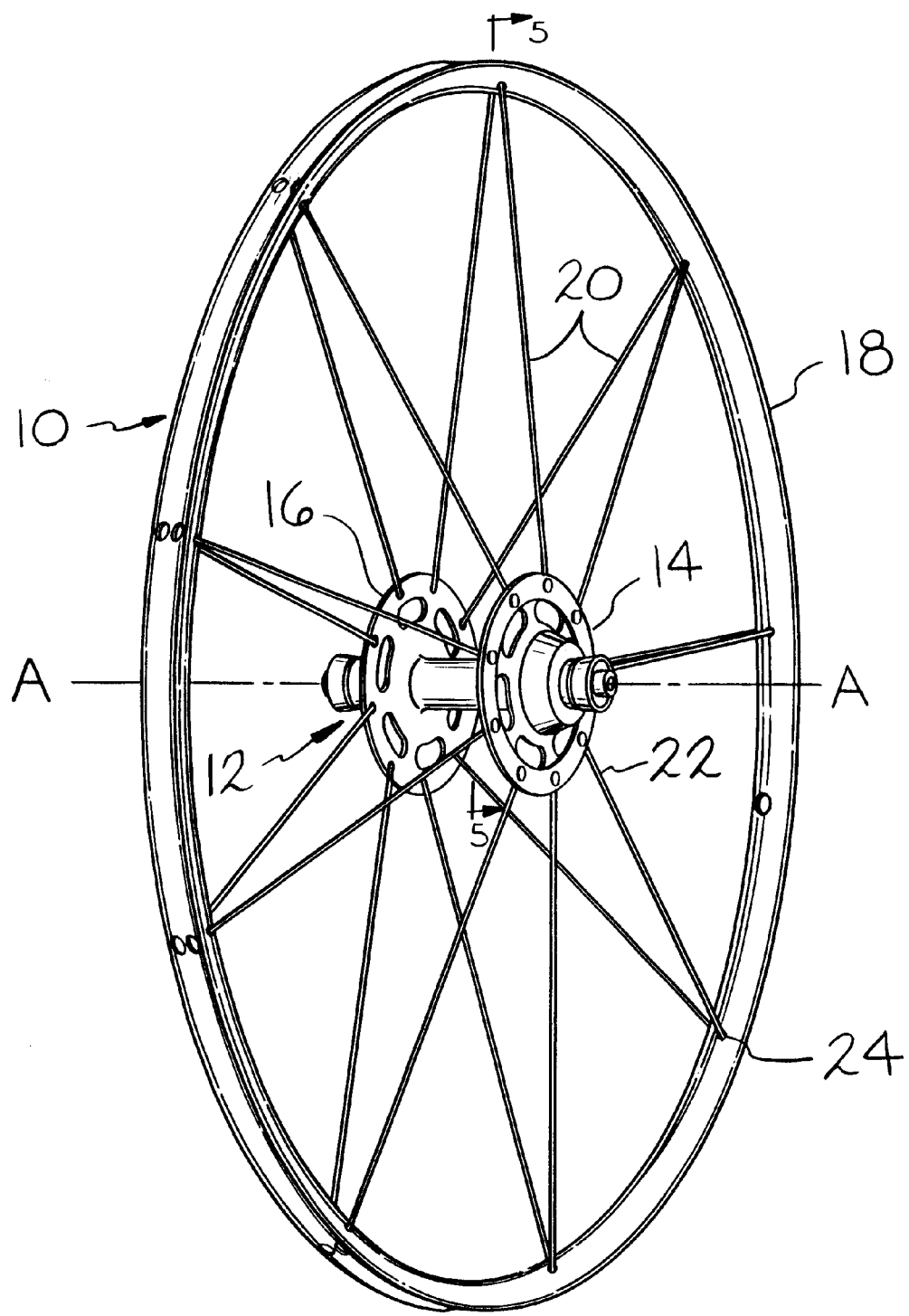
FIG. 1 is a perspective view of an 18 spoke, radially spoked wheel showing the paired spoking feature of the present invention.
Figure 2:
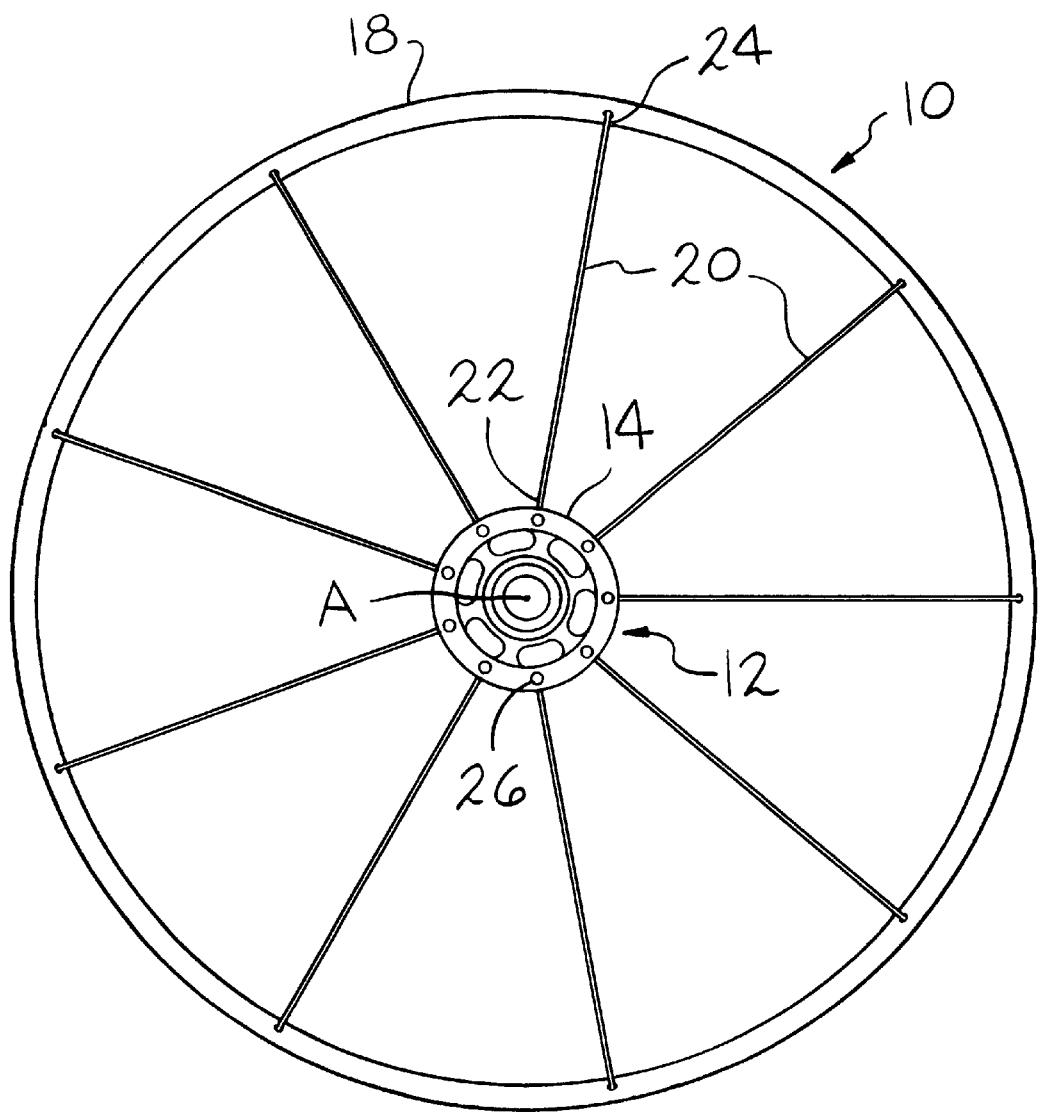
FIG. 2 is a side view of the wheel shown in FIG. 1.

Referring to FIGS. 1 and 2, an eighteen spoke, tensioned radially spoked wheel according to the present invention is indicated generally at 10. The wheel 10 comprises a largely conventional hub 12 with first and second opposed hub flanges 14 and 16. The wheel 10 has a rim 18 and is laced to the hub 12 with 18 conventional spokes 20, each having a first, inner end 22 and a second, outer end 24. The lacing of the spokes 20 is unconventional and, as shown in FIG. 1, the spokes 20 are grouped into nine pairs and each pair is connected, at its outer end, to the rim 18 at two points. Neither point is in the center plane (CP shown in FIG. 5) of the wheel 10 and the points define a line which extends perpendicularly to the center plane of the wheel and which extends in a direction that is parallel to the axis of rotation A of the wheel 10. The ends 22 of the spokes 20 are connected to the hub flanges 14 and 16.

The hub flanges 14 and 16 are positioned so that spoke apertures, indicated at 26, are aligned as between the flanges 14 and 16 so that, as shown in FIG. 2, there is no radial offset between the ends 22 of the spokes 20 of each pair of spokes. This is preferred, although it is within the scope of the invention to have offset apertures in the hub flanges 14 and 16. Beyond that, it is considered to be within the scope of the invention to connect the hub ends of spokes to opposed hub flanges so that the points of attachment at the hub flanges are substantially circumferentially offset from one another.

Figure 3:
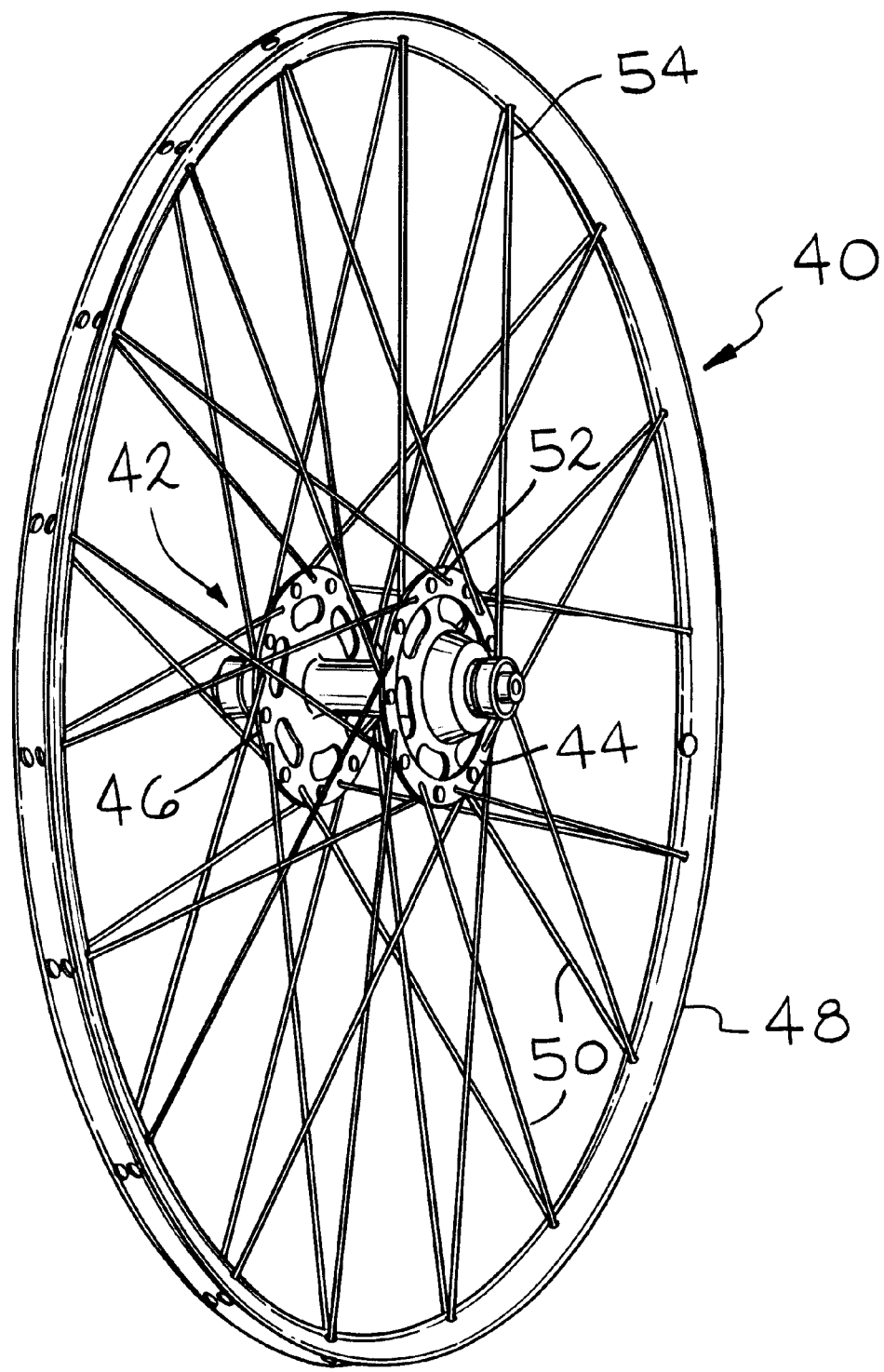
FIG. 3 is a perspective view of a 36 spoke, three cross, tangentially spoked wheel.
Figure 4:
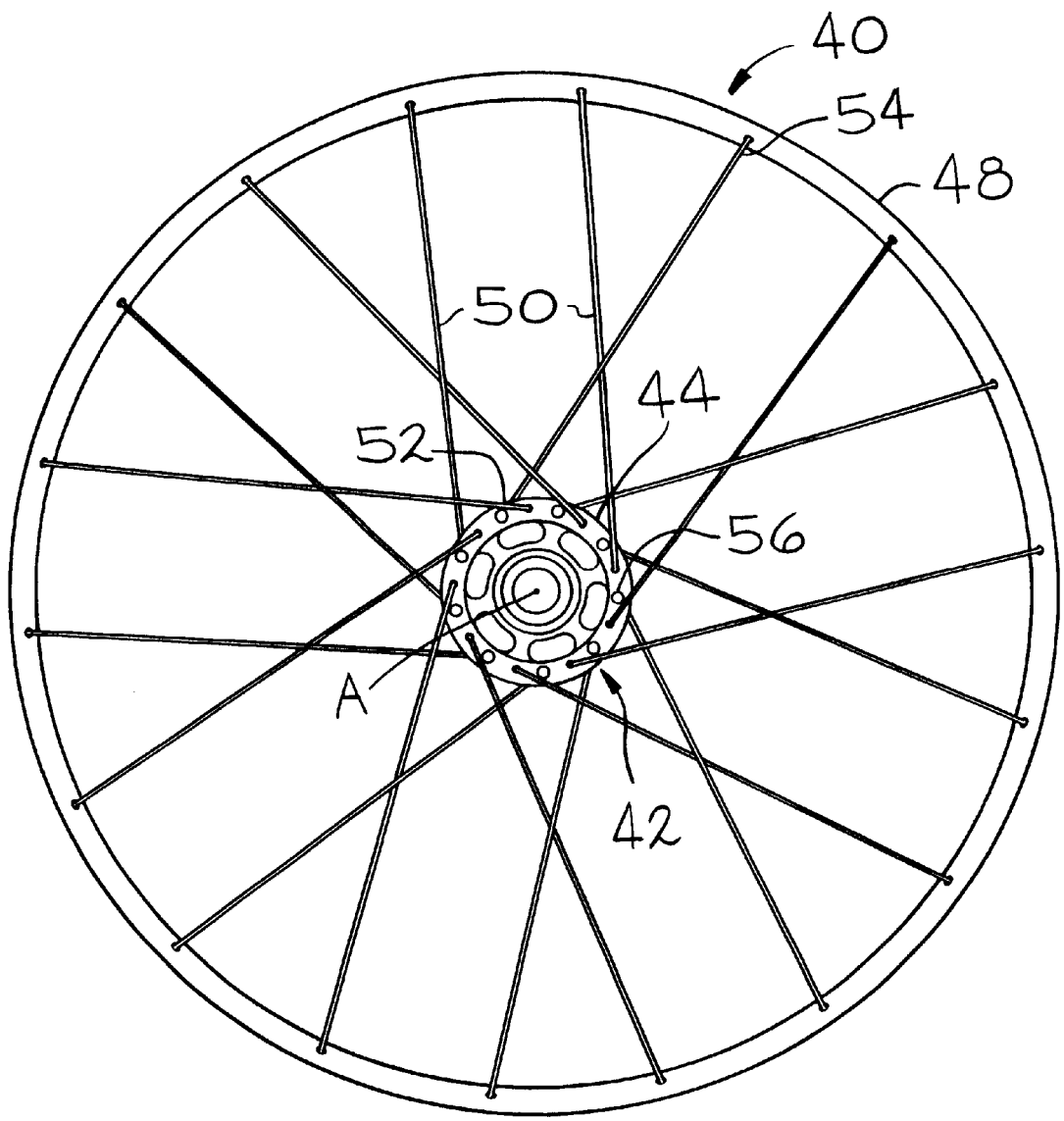
FIG. 4 is a side view of the wheel shown in FIG. 3.

Referring now to FIGS. 3 and 4, a three cross, tangentially spoked 36-spoke wheel according to the invention is indicated generally at 40. The wheel 40 comprises a largely conventional hub 42 with first and second opposed hub flanges 44 and 46. The wheel 40 has a rim 48 and is laced to the hub 42 with thirty six conventional spokes 50, each having a first, inner end 52 and a second, outer end 54. The lacing of the spokes 50 is similar to the lacing shown in FIGS. 1 and 2 for the wheel 10 in that, as shown in FIG. 3, the spokes 50 are grouped into eighteen pairs and each pair is connected, at the outer ends 54 of the spokes, to the rim 48 at two points. Neither point is in the center plane (CP shown in FIG. 5) of the wheel 40 and the points define a line which extends perpendicularly to the center plane of the wheel and which extends in a direction that is parallel to the axis of rotation A of the wheel 40. The ends 52 of the spokes 50 are connected to the hub flanges 44 and 46.

The hub flanges 44 and 46 are positioned so that spoke apertures, indicated at 56, are aligned as between the flanges 44 and 46 so that, as shown in FIG. 4, there is no radial offset between the ends 52 of the spokes 50 of each pair of spokes. This is preferred, although it is within the scope of the invention to have offset apertures in the hub flanges 44 and 46. Beyond that, it is considered to be within the scope of the invention to connect the hub ends of spokes to opposed hub flanges so that the points of attachment at the hub flanges are substantially circumferentially offset from one another.

Figure 5:
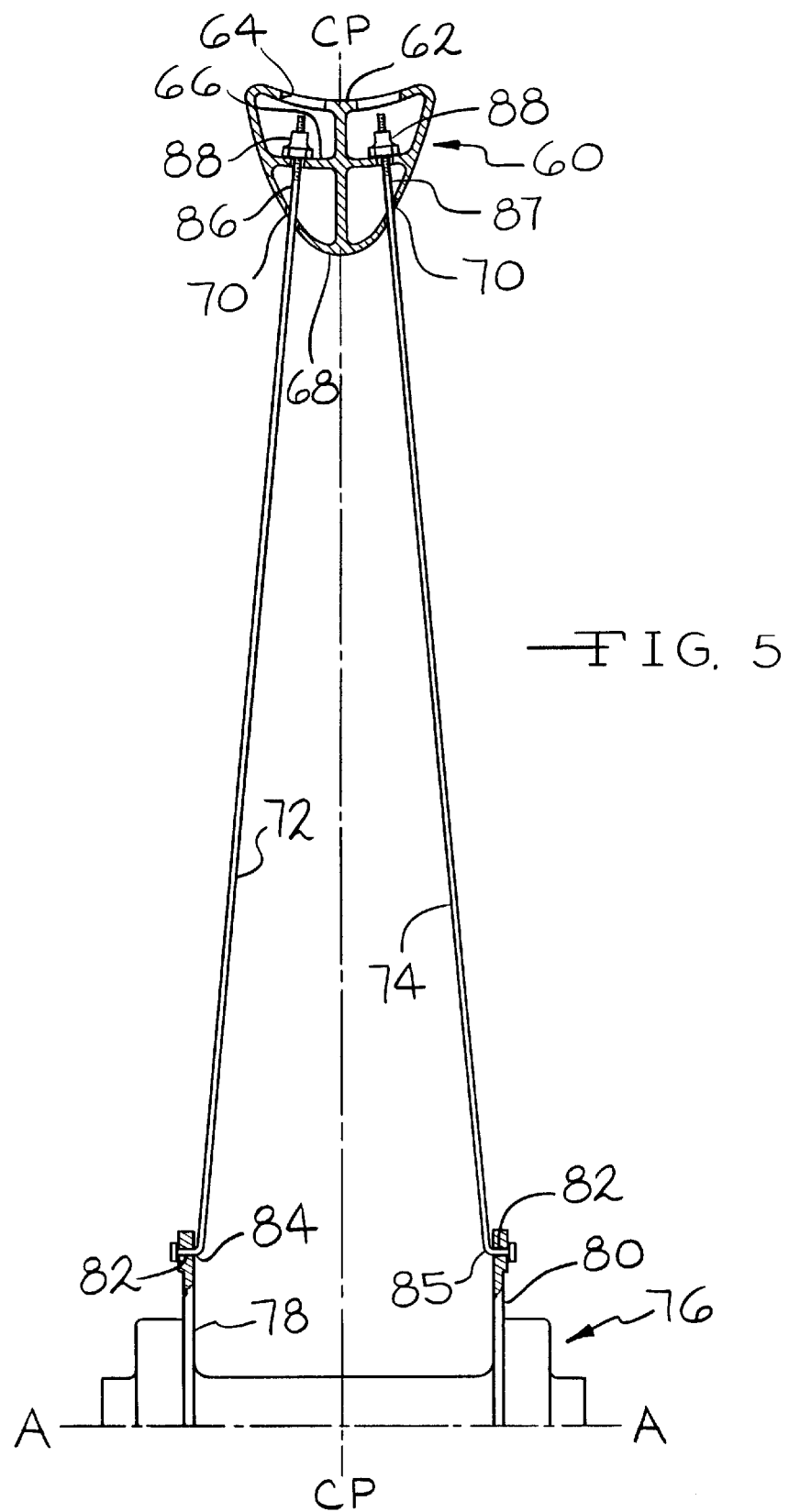
FIG. 5 is a cross section, taken along the line 5—5, of the wheel shown in FIG. 1

A rim, constructed in accordance with the present invention, is indicated generally at 60 in FIG. 5. The rim 60 has a tire mounting surface 62 with nipple tightening apertures 64, a nipple flange 66, and an inner rim surface 68 with spoke apertures 70. A reinforcing flange 71 connects and is connected to the tire-mounting surface 62, the nipple flange 66 and the inner rim surface 68. Preferably, the rim 60 is formed by extrusion.

First and second spokes 72 and 74 constitute a spoke pair and the details of their relationship to each other and to a wheel according to the invention will now be discussed in further detail. A hub, indicated generally at 76, has first and second hub flanges 78 and 80 with spoke apertures 82 for receiving spoke ends 84 and 85. These hub flanges 78 and 80 are preferably aligned axially, meaning that a line connecting an aperture 82 in flange 78 with an opposed aperture 82 in flange 80, would extend in a direction parallel to the axis of rotation A of the hub 76. Deviations from this alignment fall within the scope of the invention, but alignment parallel to the rotational axis is preferred. Outer ends 86 and 87 of the spokes 72 and 74 pass rough the spoke apertures 70 in the inner rim surface 68, through spoke apertures (not numbered) in the nipple flange 66 and are secured to nipples 88. The nipple flange spoke apertures are positioned to be aligned, in accordance with a preferred embodiment of the invention, so that a line connecting the center points of the nipple flange spoke apertures would extend in a direction parallel to the rotational axis A of the hub 76. This preferred although it is within the scope of the invention to have some circumferential offset between the nipple flange spoke apertures and the inner rim surface apertures 70. In the most preferred form of the invention in the context of a radial spoked wheel, illustrated in FIG. 5, the plane defined by the spokes 72 and 74 contains the rotational axis A. In the context of a tangentially spoked wheel, such as that shown in FIGS. 3 and 4, in the most preferred embodiment of the invention, the plane defined by two spokes in a pair is parallel to but does not intersect the rotational axis A of the hub. In these two embodiments, the spokes 72 and 74 are symmetrical about the center plane CP, and it is this symmetry, which was lacking in all prior art known to the applicant in 1991 and, as it turns out, is lacking in all low spoke count wheels in the prior art now known to the applicant in 2001, which gives wheels according to the preferred embodiments of the invention, remarkable stability neutralizing the lateral force vectors of the spokes to virtually zero at all points around the rim. In the case of a rear wheel, which is dished, physical symmetry is not possible, of course, but according to the invention, symmetrical forces are applied by the spokes relative to the center plane, even where physical symmetry is lacking. The force symmetry is achieved through differential tensioning so that there are opposed spoke vector forces (equal in magnitude and opposite in direction).

Figure 6:
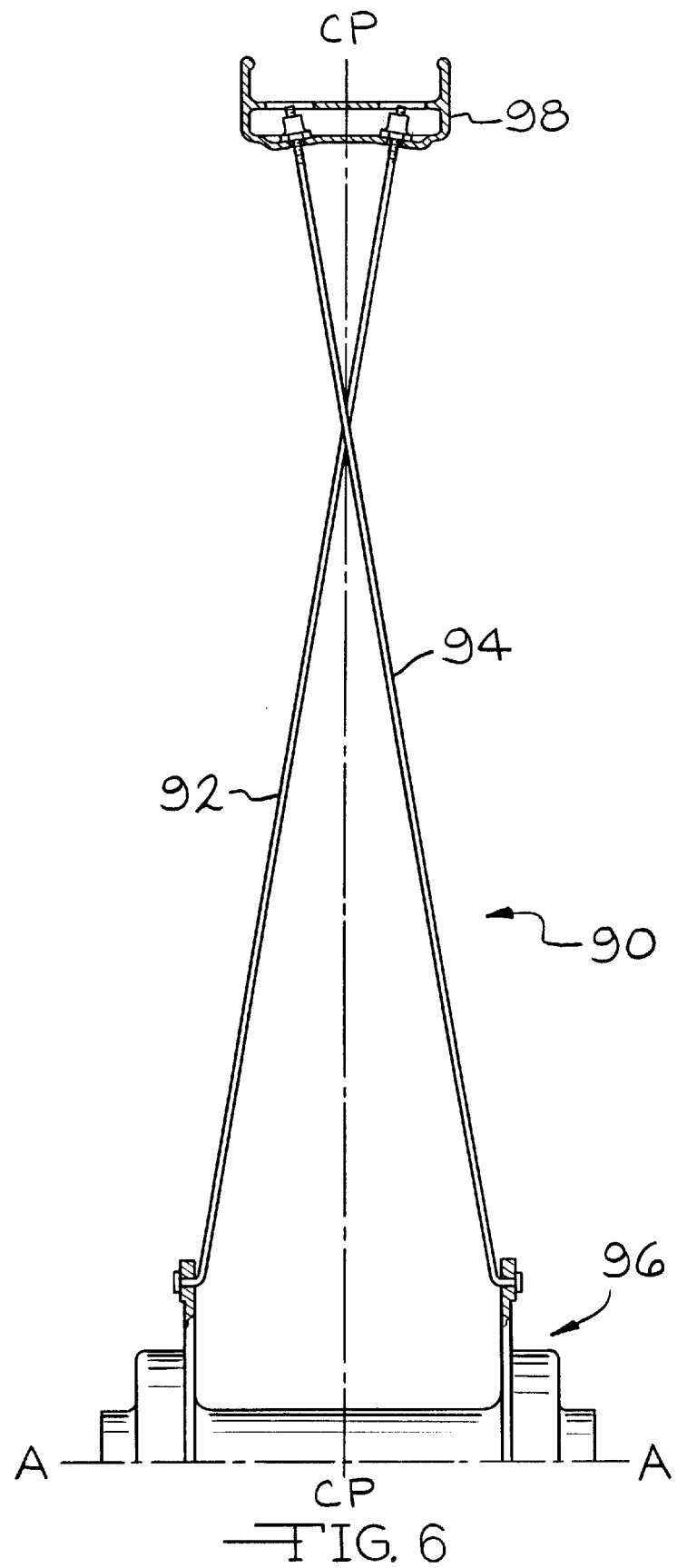
FIG. 6 is cross sectional view, similar to FIG. 5 but showing a spoke configuration wherein each spoke crosses the center plane of the wheel between the hub and the rim, according to one embodiment of the invention.

Another embodiment of a wheel according to the invention is indicated generally at 90 in FIG. 6. In the wheel 90, first and second spokes 92 and 94 each cross the center plane CP of the wheel 90 between a hub 96 and a rim 98. Because the spokes 92 and 94 do not intersect, they cannot define a plane that is parallel to the rotational axis. However, it is preferred, in the crossed spoke embodiment, to come as close as practical to having a spoke pair consisting of spokes 92 and 94 define a plane parallel to the rotational axis and, in the case of a radially spoked wheel, containing the rotational axis. Because the first and second spokes 92 and 94 cross the center plane of the wheel between the rim and the hub, they can, at a given tension, provide more lateral stability to the wheel than another spoke, at the same tension, which does not cross the center plane of the wheel between the rim and the hub.

It is believed that a further understanding of the invention will be had from a discussion of certain prior art wheels, which are illustrated in FIGS. 7 through 11.

Figure 7:
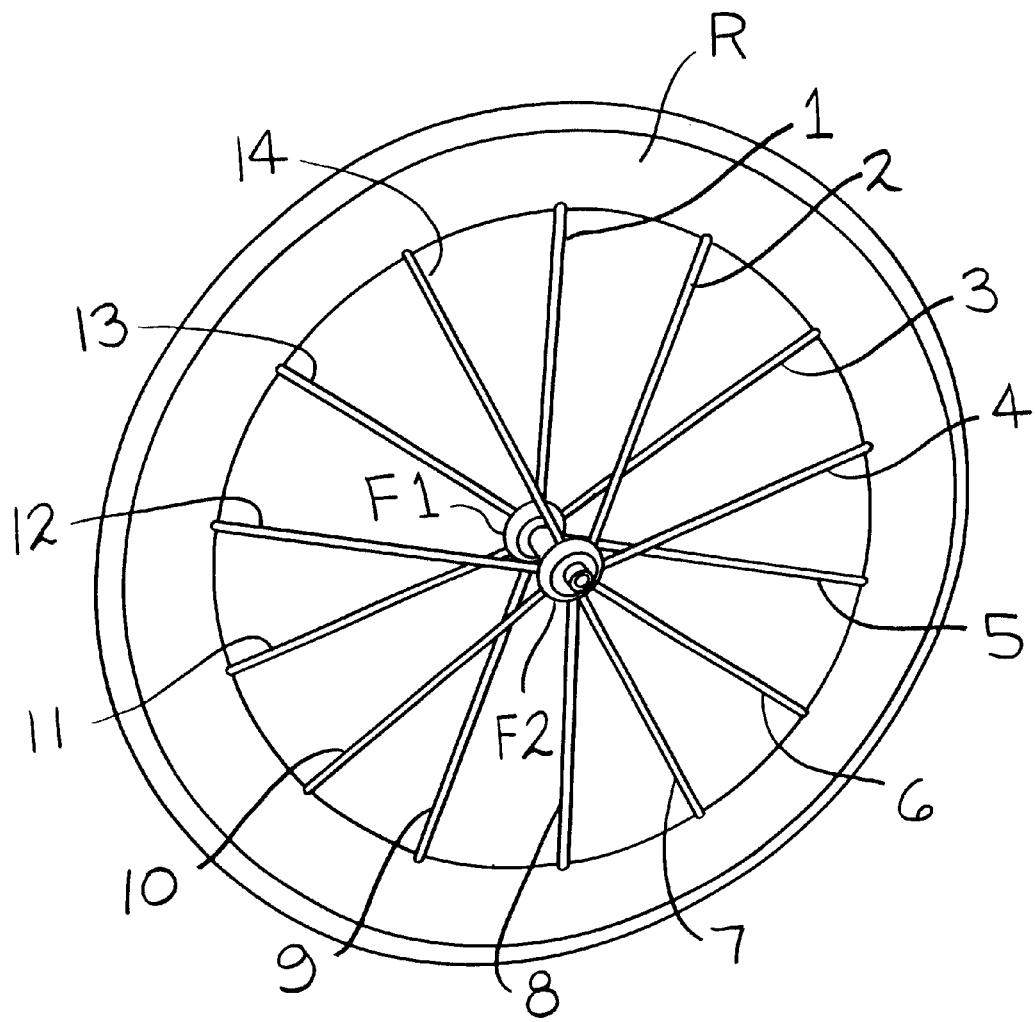
FIG. 7 is a perspective view of a prior art, conventionally laced, radially spoked, 14 spoke wheel.

FIG. 7 is based upon FIG. 4 of the previously identified Hed et al. patent and it shows a radially spoked fourteen-spoke wheel W mounted in a fork F. The fourteen spokes have been numbered 1–14. Odd numbered spokes are all connected to a right hub flange $F_1$ and all even numbered spokes are connected to a left hub flange $F_2$. The outer ends of all of the spokes are connected to the rim R and the spokes are evenly spaced about the inner circumference of the rim R, 25.7 degrees apart (360 degrees divided by 14).

A 14-spoke rim according to the present invention has 14 spokes grouped into seven pairs and each pair of spokes is evenly spaced about the inner circumference of the rim, 51.4 degrees apart (360 divided by 7). Notwithstanding the fact that the circumferential distance between spokes is doubled in a wheel according to the present invention, by comparison with the prior art as illustrated by Hed et al., a wheel according to the present invention has been shown to be more stable than the prior art wheel, by tests which are described below, following a description of another prior art wheel illustrated in FIGS. 8 and 9.

Figure 8:
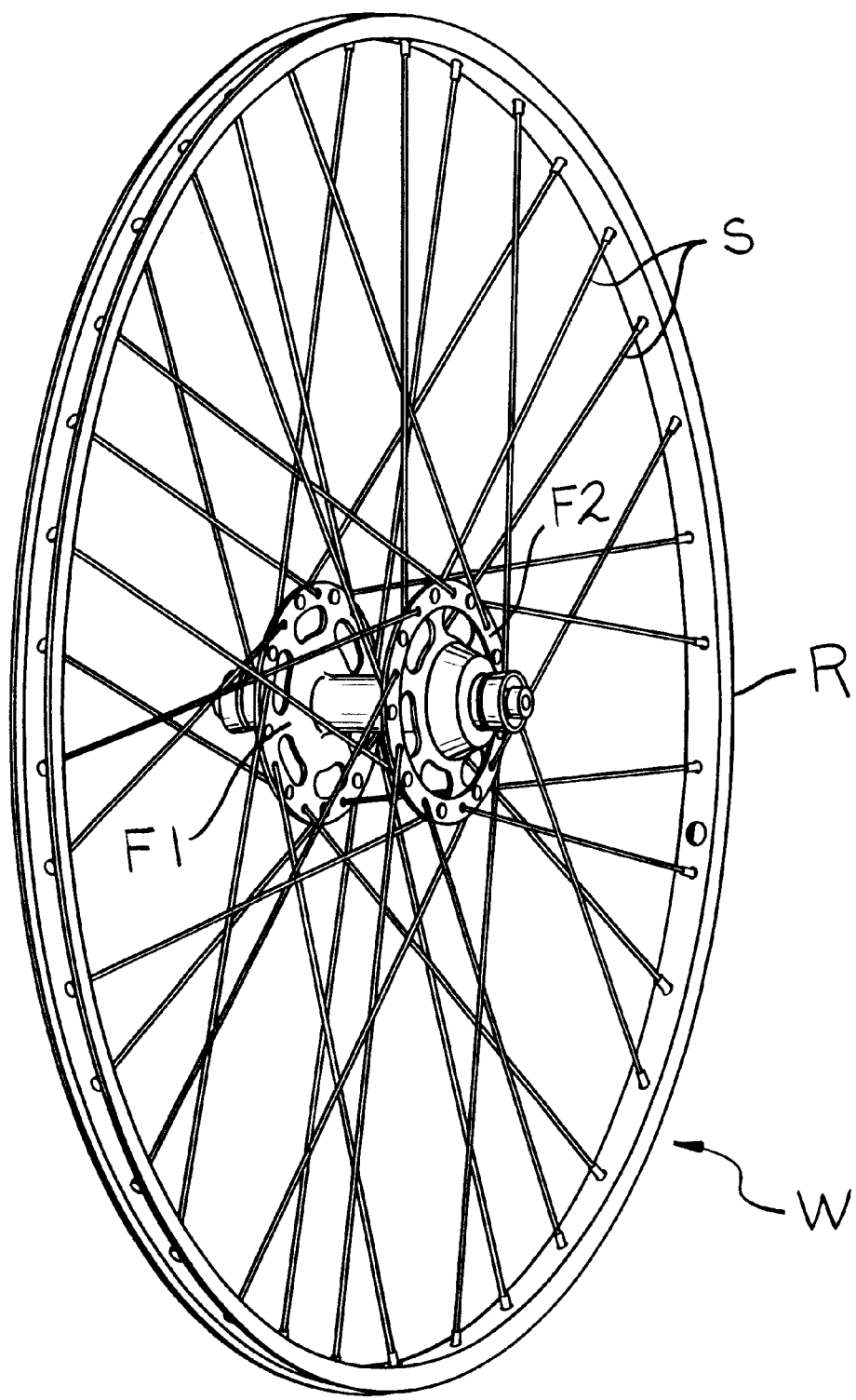
FIG. 8 is a perspective view of a prior art, conventionally laced, tangentially spoked, thirty-six spoke wheel.
Figure 9:
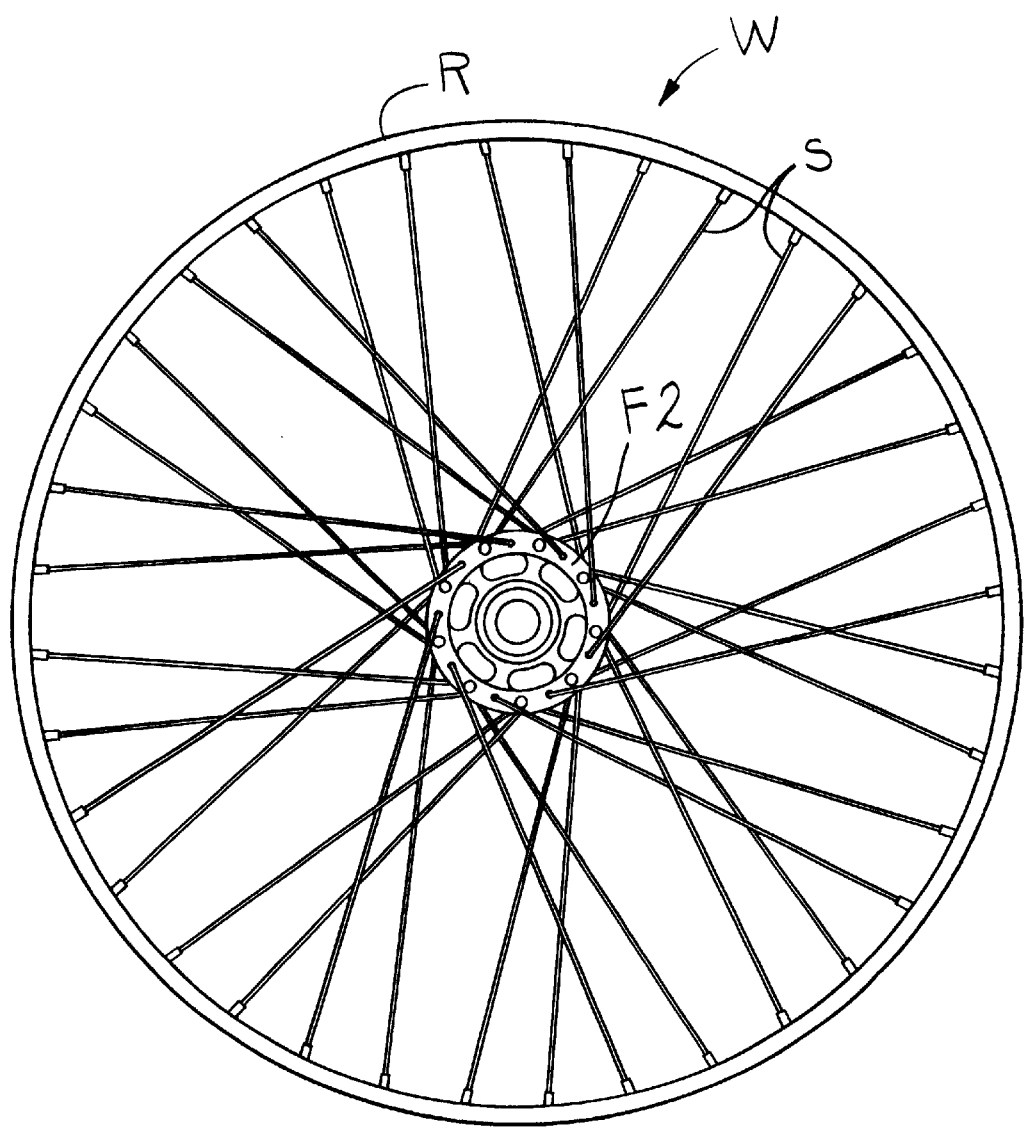
FIG. 9 is a side view of the wheel shown in FIG. 8.

A prior art, tangentially spoked wheel W, is illustrated in FIGS. 8 and 9. The wheel W has thirty-six spokes S and each one is connected, equidistantly and successively, to a rim R at circumferentially spaced points. Specifically, each spoke is connected to the rim, in the center plane of the wheel W, and spaced apart from adjacent spokes by 10 degrees (360 degrees divided by 36). Like the wheel W shown in FIG. 7, the wheel W in FIGS. 8 and 9 has spokes which alternate between a first hub flange F1 and a second hub flange F2. In contrast, a tangentially spoked 36 spoke wheel according to the present invention, has pairs of spokes spaced 20 degrees apart from adjacent pairs, as shown in FIGS. 3 and 4.

Wheels according to the present invention have been tested against some prior art wheels in order to compare rim rigidity in a wheel according to the present invention with rim rigidity in prior art wheels. The wheels were tested in the following manner.

A wheel was mounted in a Park wheel-truing stand, which firmly holds a bicycle wheel axle with no discernable deflection when moderate loads are applied to the wheel. A load of 23 lbs. was applied to the rim, in a direction parallel to the axis of rotation of the wheel, and the deflection of the rim, in that direction, was measured. In each case, the load was applied sequentially to each side of the rim at a point immediately adjacent to the point where a spoke, or, in the case of the present invention, a pair of spokes, was connected to the rim.

Before testing, each wheel was built, by the same builder, with Phil hubs, to uniform standards, with the recognition that complete uniformity is not possible with bicycle wheels. During testing, multiple measurements were taken on each side of the rim and each deflection was recorded. Results, reported herein, are averages of these measurements. In the table below, test results are reported for nine control wheels, identified C1 through C10, and 2 wheels made in accordance with the preferred embodiment of the invention, identified Ex1 and Ex2. Some of the wheels were radially laced and others were Tangentially laced; the latter type are identified by a number, other than 0, in the column headed "Number of Spoke Crosses". The term "tubular" identifies a rim that is designed for a sew-up or tubular tire.

| | FRONT WHEELS | | | |
|---|---|---|---|---|
| Rim Type/weight (g) | Number of spokes | Number of spoke crosses | Deflection in inches | Example or Control ID |
| Matrix ISO C/500 | 32 | 3 | 0.250 | C1 |
| SunM19A/350 (tubular) | 14 | 0 | 0.271 | Ex1 |
| Matrix ISO CII/405 | 32 | 3 | 0.285 | C2 |

-continued

| Rim Type/weight (g) | Number of spokes | Number of spoke crosses | Deflection in inches | Example or Control ID |
|---|---|---|---|---|
| Mavic Open 4CD/450 | 28 | 0 | 0.360 | C3 |
| AMBROISIO AERO dynamic DUREX marchio depositato allumag monocellulare/500 (tubular) | 12 | 0 | 0.401 | C4 |
| Araya Aero4/350 (tubular) | 14 | 0 | 0.417 | C5 |

REAR WHEELS

| Rim Type/weight (g) | Number of spokes | Number of spoke crosses | Deflection in inches | Example or Control ID |
|---|---|---|---|---|
| SunM19A/350 (tubular) | 20 | 2 | 0.257 | Ex2 |
| Matrix ISOC/500 | 36 | 3 | 0.265 | C6 |
| Mavic Open 4CD/450 | 36 | 3 | 0.280 | C7 |
| Matrix ISOCII/405 | 36 | 3 | 0.295 | C8 |
| Sun (19.3 mm rim width)/400 (estimated) | 20 | 2 | 0.310 | C9 |
| Mavic Open 4CD/450 | 32 | 3 | 0.345 | C10 |

The data reported in the preceding tables demonstrates that a wheel according to the present invention has excellent lateral stability at the rim, even by comparison with higher spoke count wheels. For example, Ex1 wheel, a 14 spoke radially laced wheel according to the invention exhibited 0.271-inch deflection. The only front wheel with lower deflection was C1, a 32 spoke, tangentially laced, three cross wheel. The Ex1 wheel had lower deflection than another 32 spoke, tangentially laced, three cross wheel, namely, C2. By comparison with C4, a 14 spoke radially laced wheel according to the prior art, Ex1, with 14 spokes laced, according to the present invention, with 7 pairs of spokes defining planes parallel to and intersecting the rotational axis, had 35% less deflection. The rear, tangentially laced wheel according to the invention was Ex2, and it had less deflection than all of the control rear wheels, laced according to the prior art, that were tested.

The foregoing static analyses of prior art wheels and wheels according to the present invention explains the relationship between conventional spoking and axle deflection and lateral deflection at the rim, under load. The problems which arise in a dynamic bicycle system including conventionally spoked wheels will now be considered vis a vis the advantages of a dynamic bicycle system including a front wheel according to the present invention.

The subject of speed wobble or shimmy in bicycles has received much attention because it is extremely dangerous. Shimmy is known to occur in bicycles having front wheels that are conventionally spoked. Speed wobble or shimmy is used herein to refer to a condition where the entire front end of a bicycle oscillates at a frequency of several times per second and wherein the steering bar and the head tube moves laterally a substantial distance during each oscillation. The distance can be more than one inch in severe instances and a rider of a bike which is oscillating to this extent at high speed is in a "frightening situation." John Kukoda, Bicycling, April, 1992, page 152. Theories abound about how to stop shimmy when it occurs. According to John Kukoda, "factors [which contribute to speed shimmy or wobble] include a tight headset that inhibits free turning of the fork; a short wheelbase and or chainstays; frame flexibility along the top tube (especially in large frame sizes); light wheels; untrue wheels; insufficient trail (usually the result of too much fork rake on a frame with a steep head tube angle); a heavily loaded handlebar bag; flexy loaded racks; and improperly packed panniers that allow the load to shift side to side."

Until now, no one has addressed the problem to the extent needed to provide a system in which the onset of shimmy is prevented. For the reasons discussed below, a bicycle according to the present invention is not susceptible to speed wobble or shimmy.

The present analysis begins with the recognition that all wheels deform, to some extent, at the road contact point (RCP) under load. As a consequence, when a wheel is loaded, the radius of the wheel between the hub and the RCP is reduced and the radius elsewhere in the wheel is increased. There is a flat spot in the rim adjacent the RCP in a loaded wheel. The length of the flat spot is proportional to the pliability or flexibility of the rim. In a tensioned spoked wheel, the flat spot phenomenon partially unloads the spokes at and near the RCP while the tension in the other spokes is increased.

Figure 10:
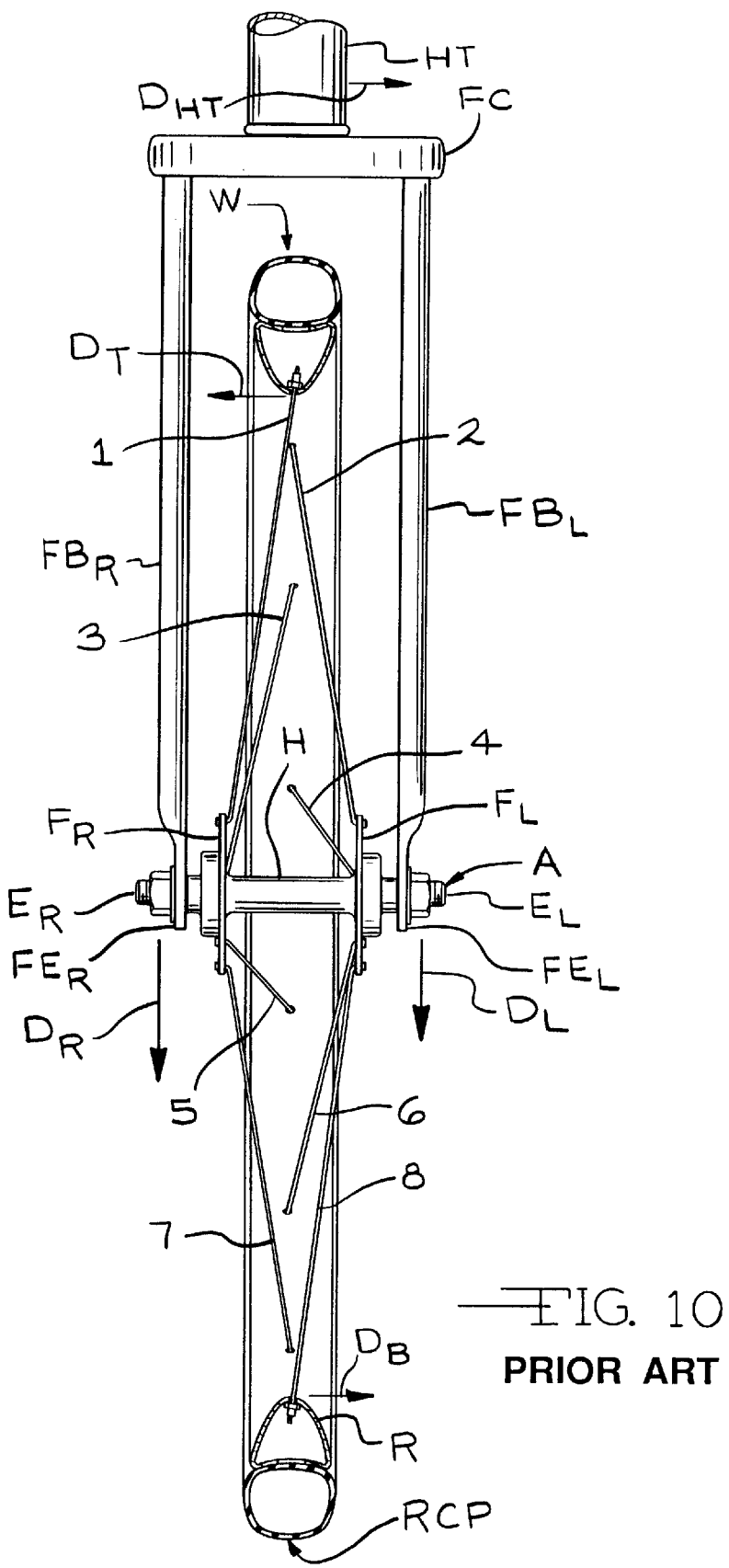
FIG. 10 is a view, in partial cross section, of a prior art, conventionally spoked wheel mounted on a fork of a bicycle, viewed from the front of the bicycle looking toward the rear of the bicycle.
Figure 11:
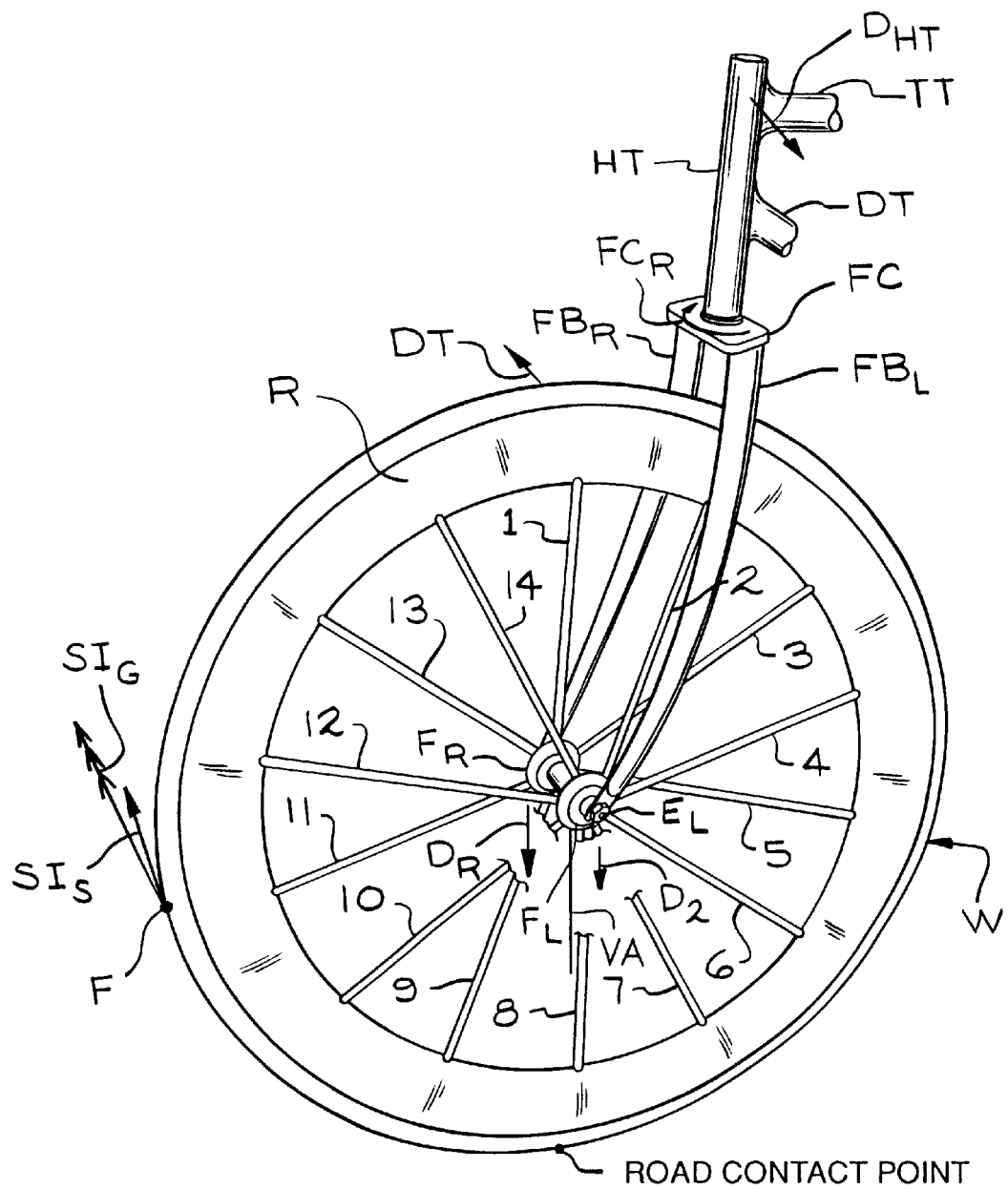
FIG. 11 is a perspective view of the conventionally spoked wheel shown in FIG. 10, including a portion of a bicycle frame.
Figure 12:
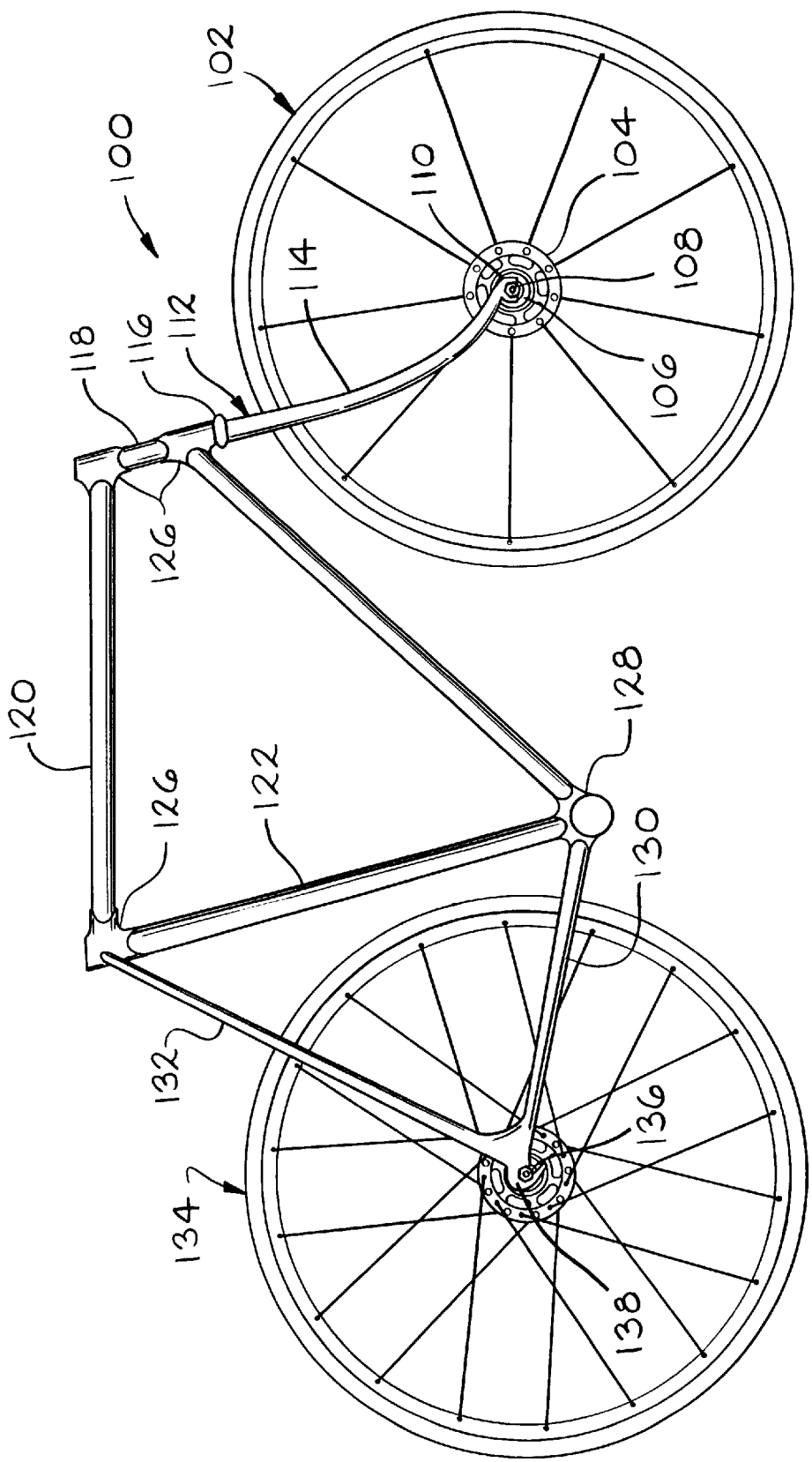
FIG. 12 is a side view of a bicycle according to the invention and comprising a frame with front and rear wheels mounted on the frame.

Referring now to FIGS. 10 and 11, there is illustrated a conventionally radially spoked 14 spoke front wheel W mounted in the fork F of a bicycle frame (only a portion of the frame F is illustrated in FIG. 11). The fourteen spokes have been numbered 1–14. Odd numbered spokes are all connected to a right hub flange $F_R$ and all even numbered spokes are connected to a left hub flange $F_L$. Only spokes 1–8 are shown in FIG. 10. Let's consider the case, discussed above in the description of the prior art section, where each spoke in the wheel W (FIGS. 10 and 11) is loaded with a 200 pound tensile force when the wheel is unloaded. When a one hundred and fifty pound load is applied downwardly through the fork which comprises a fork crown FC, a right fork blade $FB_R$ and a left fork blade $FB_L$, the load is split between the fork blades FB which transmit 75 pound loads through fork ends $FE_R$ and $FE_L$ to the ends $E_R$ and $E_L$ of an axle A. Spoke 8 intersects the RCP and has its tension reduced approximately 75 pounds so that its tension is reduced to about 125 pounds. As noted previously, measurements show that, under the stated load with spoke 8, which is attached to the left hub flange $F_L$, centered over the RCP, the left end $E_L$ of the axle A deflects downwardly, as indicated by the arrow $D_L$, 0.010 inches while the right end $E_R$ of the axle A deflects downwardly a distance of 0.025 inches as indicated by the arrow $D_R$. When the wheel W is rotated so that a spoke such as 7 that is attached to the right hub flange $F_R$, is centered over the RCP (not shown), the left end $E_L$ of the axle A deflects downwardly 0.025 inches (not shown) while the right end $E_R$ of the axle A deflects downwardly a distance of 0.010 inches (not shown). In the fourteen spoke wheel W under consideration, assuming all spokes are in equal tension, during one revolution under load, the axle A will depart from a horizontal orientation 14 times a distance of 0.015 inches over its length, seven times at the left end $E_L$ of the axle A and seven times at the right end $E_R$ of the axle A, alternatingly. These deflections generate forces which are transmitted through, and largely dissipated in the fork blades FB, the fork crown FC, the steering tube ST and, in some cases, the rest of the bicycle frame. When the forces are transmitted through the fork blades FB to the head tube HT, it will deflect to the left, as indicated by the arrow $D_{HT}$, and the fork crown FC (which is mounted on the steering tube, not shown) turns or rotates relative to the head tube HT as indicated by the arrow $FC_R$. So long as the bicycle has a proper trail, i.e., the axis of the head tube intersects the road ahead of the road contact point RCP, the head tube deflection $D_{HT}$ will generate a steering impulse which is indicated by the arrow $SI_S$. The subscript S in $SI_S$ identifies this impulse as one that is generated because of the spoke configuration of the wheel W. When the wheel W is rolling, and the next spoke, i.e., spoke 9 which is connected to the right wheel flange $F_R$, is centered over the RCP (not shown), the directions of the vectors or arrows $SI_S$, $FC_R$, and $D_{HT}$ are reversed, and the magnitude of $D_L$ is increased to 0.025 inches while the magnitude of $D_R$ is decreased to 0.010 inches. Modern bicycles can accommodate these forces with very little disturbance detected by the rider, so long as the spoke count is high enough. In low spoke count wheels, such as the fourteen spoker illustrated in FIGS. 10 and 11, the steering impulses generated due to the conventional spoking pattern are very noticeable, although they can generally be tolerated except in demanding conditions such as racing with high lean angle cornering. In demanding conditions, the steering impulses induced by a low spoke count front wheel with a conventional spoking pattern can lift the front wheel off the ground in high lean angle turns.

The situation is different in the case of a rear wheel on an axle, which is mounted on rear dropouts, because the seat stay and the chain stay do not have the flexibility of the fork blades. Consequently, there is little vertical axle deflection in the case of a rear wheel. However, the forces attributable to conventional spoking, discussed above, in the context of a front wheel, cause the rim of a conventionally spoked rear wheel to be deflected at the RCP, away from the spoke centered over the RCP at any given time during revolution which, in effect, causes the RCP of a conventionally spoked rear wheel to trace a sinusoidal pattern on the road as a loaded rear wheel rolls along. In the case of the fourteen spoke conventional wheel, mounted in a Park truing stand as it would be at the rear of a bicycle, with the axle restrained and a one hundred and fifty pound load applied, a right departure of the RCP of 0.1 inch was measured from the wheel center plane when a left spoke was centered over the RCP and a left departure of the RCP of 0.1 inch was measured from the wheel center plane when a right spoke was centered over the RCP. This presents a problem in the case of high lean angle turns because the force of the rear wheel against the road surface is pulsed which can allow the rear wheel to lose static friction with the road surface in a worst case high lean angle turn scenario. In the context of straight or level riding, the sinusoidal tracing of the rear RCP relative to the vehicle line of travel in effect means that the rear RCP is shifted, left to right and right to left, of the vehicle center of mass which normally lies in the rear wheel center plane, with the passage of successive spokes over the rear RCP. This repetitive shift of the rear RCP relative to the system center of mass causes the entire frame to move left to right and right to left and, to the extent that the head tube, as part of the frame, is leaned to the right or to the left, a steering pulse is induced to the left or to the right, respectively and it is now appreciated that a conventionally spoke rear wheel can and does induce steering pulses quite independently of the front wheel under all riding conditions.

The foregoing analysis of the conventionally laced front wheel is based upon the ideal condition that all of the spokes in the wheel W are equally tensioned. In the real world, rims that are true do not have equally tensioned spokes. Instead, one of the spokes will be tighter than the rest and it is frequently adjacent to spokes that are in substantially less tension. Accordingly, it will be appreciated that, at least once per revolution, the horizontal axle deflections in a conventionally spoked fourteen spoke front wheel will be substantially greater than those reported above. In any case, as a result of the axle deflections and associated fork blade deflections under the condition illustrated in FIGS. 10 and 11, there are steering impulses, indicated by the arrow $SI_S$ in FIG. 11, and the impulse generated when the tightest spoke passes over the road contact point RCP, is the most substantial. As the speed of wheel rotation increases, so too does another steering impulse which is generated during rotation of a conventionally spoked front wheel.

At high rates of rotation, the wheel W develops substantial gyroscopic inertia, which is proportional to the rate of rotation. The deflections of the axle A due to the conventional spoking pattern described above with reference to FIGS. 10 and 11, are transmitted to the steering tube and ultimately, as a result of fork rake, trail and head tube angle, result in cyclic rotational steering impulses seen at the handle bar, at all riding speeds. As described previously, the steering bar rotates clockwise and counter-clockwise, from the view of the rider, with the passage of a left spoke and a right spoke, respectively, over the RCP as the wheel rolls along under load causing the front of the front wheel to move right and left, respectively. At high rates of rotation (not shown), the wheel W of FIGS. 10 and 11 develops substantial gyroscopic inertia, which is proportional to the rate of rotation. The deflections of the axle A, described above with reference to FIGS. 10 and 11, translate, at high rotational speeds, to rotation of the axle in a substantially horizontal plane, about a substantially vertical axis VA, illustrated in FIG. 11, and passing through the mid-point of the axle. This rotation of the axle about the axis VA is known as precession. This precessional axle movement is in the same direction as the steering impulse $SI_S$ described previously as attributable to the conventional spoking pattern. In FIG. 11, arrow $SI_G$ represents the force generated, at high rotational speeds, as the axle dips lower on the right as represented by $D_R$. Arrow $SI_G$ reflects movement of the front F of the wheel W which is due to gyroscopic inertia and precession. Arrow $SI_S$ reflects movement of the front F of the wheel W due to the conventional spoke pattern induced steering impulse. The two movements or impulses $SI_S$ and $SI_G$ are substantially in phase and, as a consequence, their net effect on the wheel W is cumulative. In the case of the rotating wheel W of FIG. 11, the precession motion translates into a second steering impulse, indicated in FIG. 11 by the multi-headed arrow $SI_G$, and that steering impulse is in the same direction as the spoke induced steering impulse $SI_S$. The arrow $SI_G$ is multi-headed to reflect its variable magnitude, which is a function of the disturbing force (relatively constant) and the rate at which the wheel is rotating. As the rate of rotation increases, so too does the magnitude of the steering impulse $SI_G$ associated with the precession motion of the axle/axis. The consequence of the combination of the steering impulses $SI_S$ and $SI_G$ at low speeds may be tolerable. At higher speeds, however, the magnitude of the $SI_G$ will reach a point where, combined with the $SI_S$, speed shimmy or wobble occurs. The precise point or speed at which speed wobble or shimmy is induced is affected by the factors listed above in the quotation from *Bicycling*. However, the source of speed wobble or shimmy is the steering impulse generated as a consequence of the conventional spoking pattern. At certain bicycles speeds or wheel rotation frequencies, an oscillating vibration is set up which is fed, on one side by the forces associated with axle deflection and precession motion in the wheel and, on the other side, by the fork reaction forces which tend to return the axle to an undeflected position. As noted above, the magnitude of the precession motion increases with speed and there is a speed or speed within the dynamic bicycle system at which the magnitude of the vibrations increases beyond the capacity of the mass damper constituting the rider, the fork and other frame members to dampen the vibration and the result is the well documented speed wobble or shimmy where the entire bicycle begins vibrating wildly. This condition has mystified experts in the bicycle field, although they have come to recognize some of the factors, listed above, which influence the onset of speed wobble or shimmy. These observations are consistent with the explanation above, but so far, no one else has recognized that the conventional spoking pattern is the source of this evil and dangerous phenomenon.

The bicycle of the present invention solves the problem of speed wobble or shimmy by eliminating its source, namely, the steering impulses generated as a result of the conventional pattern of spoking in wheels. Without the forces generated when the axles deflect, there would be no exciting impulses to trigger the spoke induced steering impulses and the associated precession and rocking motions and, thus, no energy to drive the vibration at levels which exceed the capacity of the loaded bicycle system (which acts as a mass damper) to absorb them. The low spoke count wheels of the present invention have greater lateral stability than conventionally spoked wheels, even though high tension spokes are paired together, doubling the circumferential distance between spokes by comparison with a conventionally spoked wheel. The lower spoke count wheels of the present invention have greater lateral stability than paired spoke wheels in which the spokes do not cross the center plane of the wheel between the hub and the rim Referring now to FIG. 12, a bicycle according to the present invention is indicated generally at 100. The bicycle 100 comprises a front wheel 102, which is an eighteen-spoke wheel 10 illustrated in FIGS. 1 and 2. The wheel 102 includes hub flanges 104 (one is visible in FIG. 11) which are supported on a hub 106 for rotation about an axle 108, which is mounted in the ends 110 of a fork 112. The fork 112 comprises fork blades 114 supported in a fork crown 116, which, in turn, is supported in a head tube 118. The bicycle further comprises a top tube 120, a seat tube 122, a down tube 124, lugs 126, a bottom bracket 128, chain stays 130 and seat stays 132. A rear wheel 134, corresponding generally with the wheel 40 shown in FIGS. 3 and 4, is mounted for rotation about an axle 136 which is supported in dropouts 138. It is preferred that the rear wheel have crossed paired spoking. However, a bicycle according to the present invention may include a conventional rear wheel and a front wheel with crossed paired spoking according to the present invention. As a consequence, the bicycle 100 will not be susceptible to speed wobble or shimmy originating in the front wheel. In another embodiment, the bicycle comprises a front wheel and the rear wheel 134, again, preferably with crossed paired spoking, and, in this embodiment, the sinusoidal tracking of the rear wheel is eliminated. In the most preferred embodiment, the bicycle comprises the front wheel 102 and the rear wheel 134, both with crossed paired spoking.

It is believed that the foregoing description demonstrates that a wheel with a given spoke count, according to the present invention, has better stability than conventionally laced wheels of the given number of spokes and, in most cases, better stability than conventionally laced wheels having more than the given number of spokes. It has been further demonstrated that a bicycle including a front wheel according to the present invention is not susceptible to the age-old problem of speed shimmy or wobble.

It will be appreciated that the invention is not limited to the foregoing detailed description but, rather, has broad applications in the field of wheels. For example, Tioga® has introduced a wheel in which conventional spokes are replaced with a Kevlar® lacing which provides tension between the rim and hub in what is believed to be a conventional fashion, that is, lacing is connected to the rim at points which are evenly, circumferentially spaced, at each point, tension is either applied from the left side of the hub or the right side of the hub as opposed to, in the case of the present invention, the case where pairs or groups of pairs of spokes or other tensioning members apply tension from the left and right side of the hub to points which are closer together than the distance between the groups or pairs of clusters, or at points which are circumferentially coincident, so that unresolved side or lateral forces are reduced, by comparison with a wheel laced according to the prior art, or eliminated.

Figure 13:
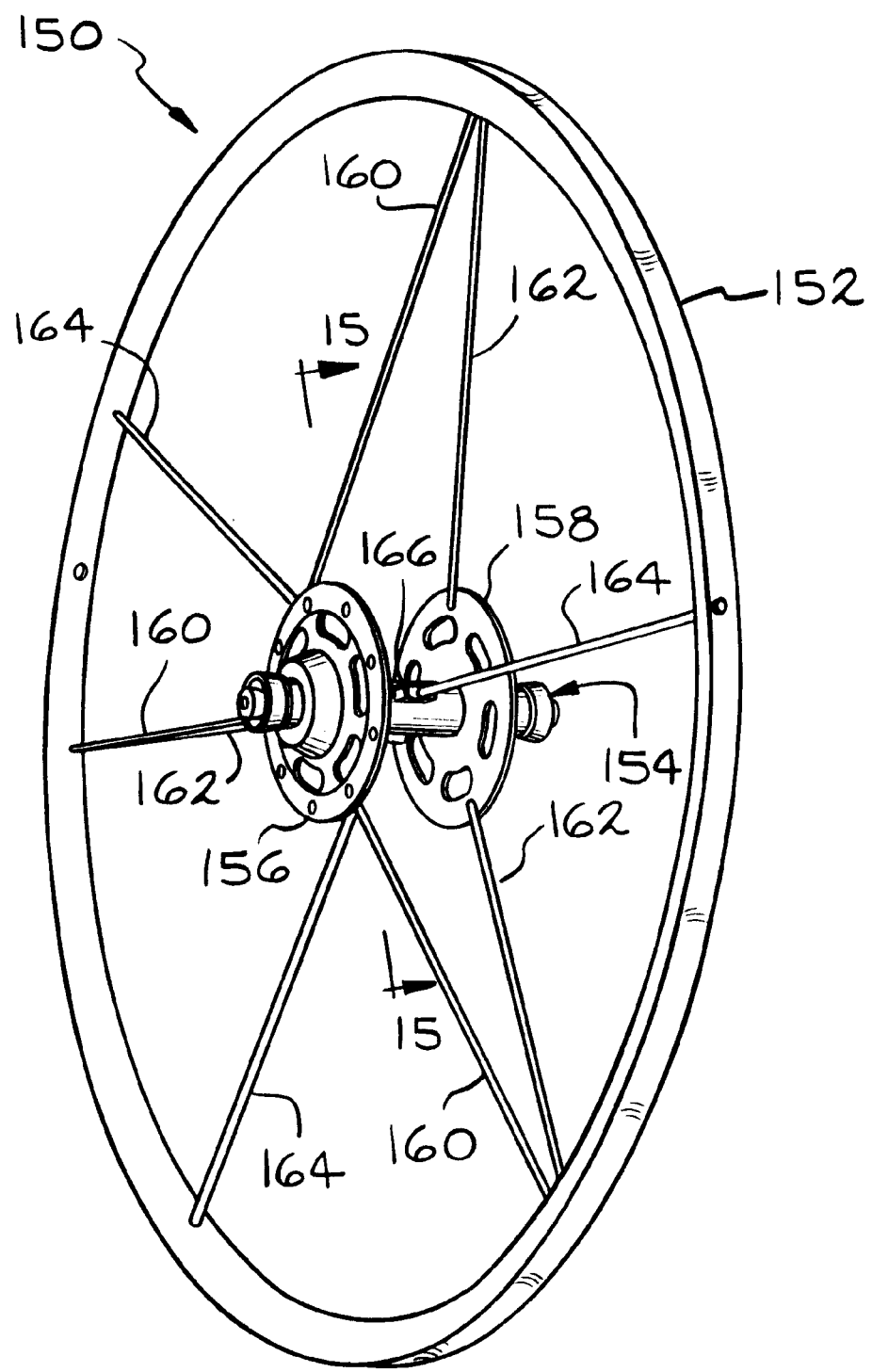
FIG. 13 is a perspective view of a nine spoke, radially spoked wheel according to the invention.

Referring now to FIG. 13, a wheel according to the presently claimed invention is indicated generally at 150. The wheel 150 comprises a rim 152, a hub indicated generally at 154 and including a left hub flange 156 and a right hub flange 158 and a total of nine spokes, six of which are paired and three of which are in or immediately adjacent to the center plane (previously defined) of the wheel 150. The spoke pairs comprise first spokes 160 and second spokes 162. The paired spokes 160 and 162 are connected to the rim 152 at points which are substantially circumferentially coincident. In FIG. 13, the rim connection points of each spoke pair are exactly circumferentially coincident although it has been determined that some offset can be tolerated without seriously impairing a wheels resistance to speed wobble or shimmy. Excellent results have been obtained with about one half inch of offset which makes the present invention adaptable to most conventional rims. The paired spokes 160 are connected to the left hub flange 156 and the paired spokes 162 are connected to the right hub flange 158. It is preferred that the hub flanges 156 and 158 be symmetrical about the wheel center plane although, as explained above, good results can be obtained if there is a minor offset of one hub flange relative to the other.

Between the paired spokes, unpaired spokes 164 are each connected, at one end to the rim 152 and at the other end to a boss 166 on the hub 154. In a most preferred embodiment, the unpaired spokes are coincident with the center plane of the wheel 150 so that they exert virtually no lateral force vectors on the rim 152.

Figure 14:
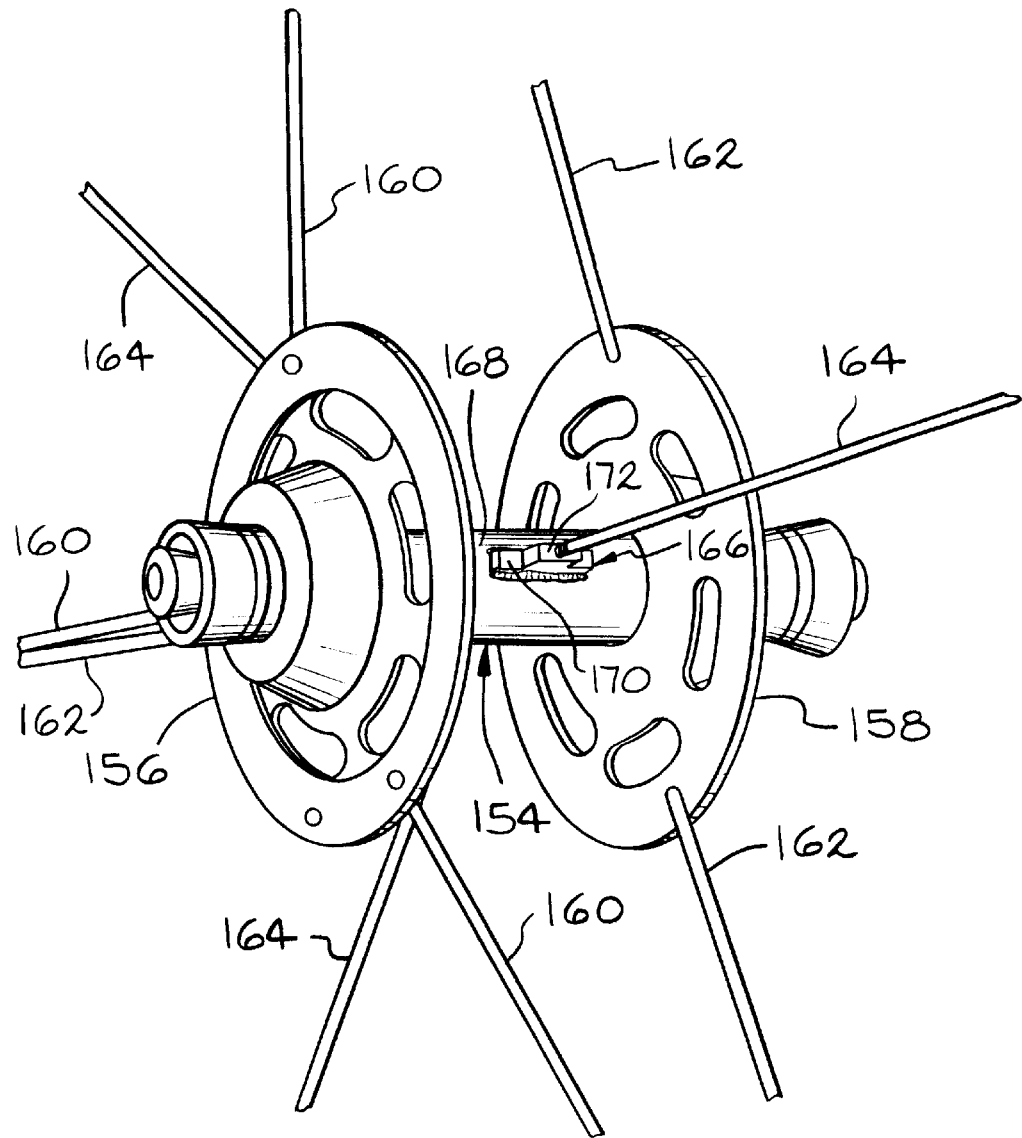
FIG. 14 is a partial perspective view of the wheel hub and hub and spoke connections of the wheel illustrated in FIG. 13.

The bosses 166 are shown in more detail in FIGS. 14 and 15. The bosses 166 are welded to the central portion 168 of the hub 154. The bosses comprise a base portion 170 and a spoke receiving portion 172. As shown in FIG. 15, the spoke-receiving portion 172 is internally threaded to receive a threaded portion 174 of the unpaired spokes 164 and to support the unpaired spokes in a radial orientation relative to the hub. In this embodiment, it is preferred that the unpaired spokes 164 be threaded at both ends so that their tension can be adjusted with conventional nipples at the rim, after the threaded portions 174 are engaged in the spoke receiving portions 172 of the bosses 166.

The three unpaired spokes 164 are positioned between the spoke pairs 160 and 162, preferably at the mid-point between the paired spokes. In the embodiment illustrated in FIG. 13, the spoke pairs 160 and 162 are offset from other spoke pairs by one hundred and twenty degrees and the unpaired spokes 164 are sixty degrees from the spoke pairs.

Referring now to FIG. 16, a nipple 180 with a head 182 and an internally threaded shank 184 secures the unpaired spoke 164 to the central portion 168 of the hub 154. The nipple shank 184 is received in an aperture in the central portion 168 of the hub and the nipple head 182 engages an inside surface 186 of the hub central portion 168. It is preferred that the aperture in the hub central portion 168 lie in the center plane of the wheel so that the unpaired spokes 164 lie within the center plane of the wheel.

Referring now to FIG. 17, a collar 190 has three bosses 192 (only one is shown in FIG. 17) offset one hundred and twenty degrees from each other. The collar is sized to slide over the central portion 168 of the hub 154 and may be secured to the central portion with suitable adhesives, or by welding or with fasteners (not shown), as desired. The boss 192 has an internally threaded bore for receiving a threaded end of an unpaired spoke and supporting it in a radial orientation relative to the hub, in or immediately adjacent to the center plane of the wheel.

Referring now to FIG. 18, an unpaired spoke 200 with a head 202 is supported in the central portion 168 of the hub 154. The head 202 engages the inside surface 186 of the hub central portion 168. In order to assemble this embodiment, an access hole (not shown) would be provided in the hub central portion, opposite the aperture through which the unpaired spoke is received. With the axle (not shown) removed, the spoke would be fed through the access aperture, which would have a diameter greater than the diameter of the spoke head and through the aperture through which the unpaired spoke is received until the head 202 engages the inside surface 186 of the hub central portion 168. The access apertures should then be plugged or sealed.

Figure 19:
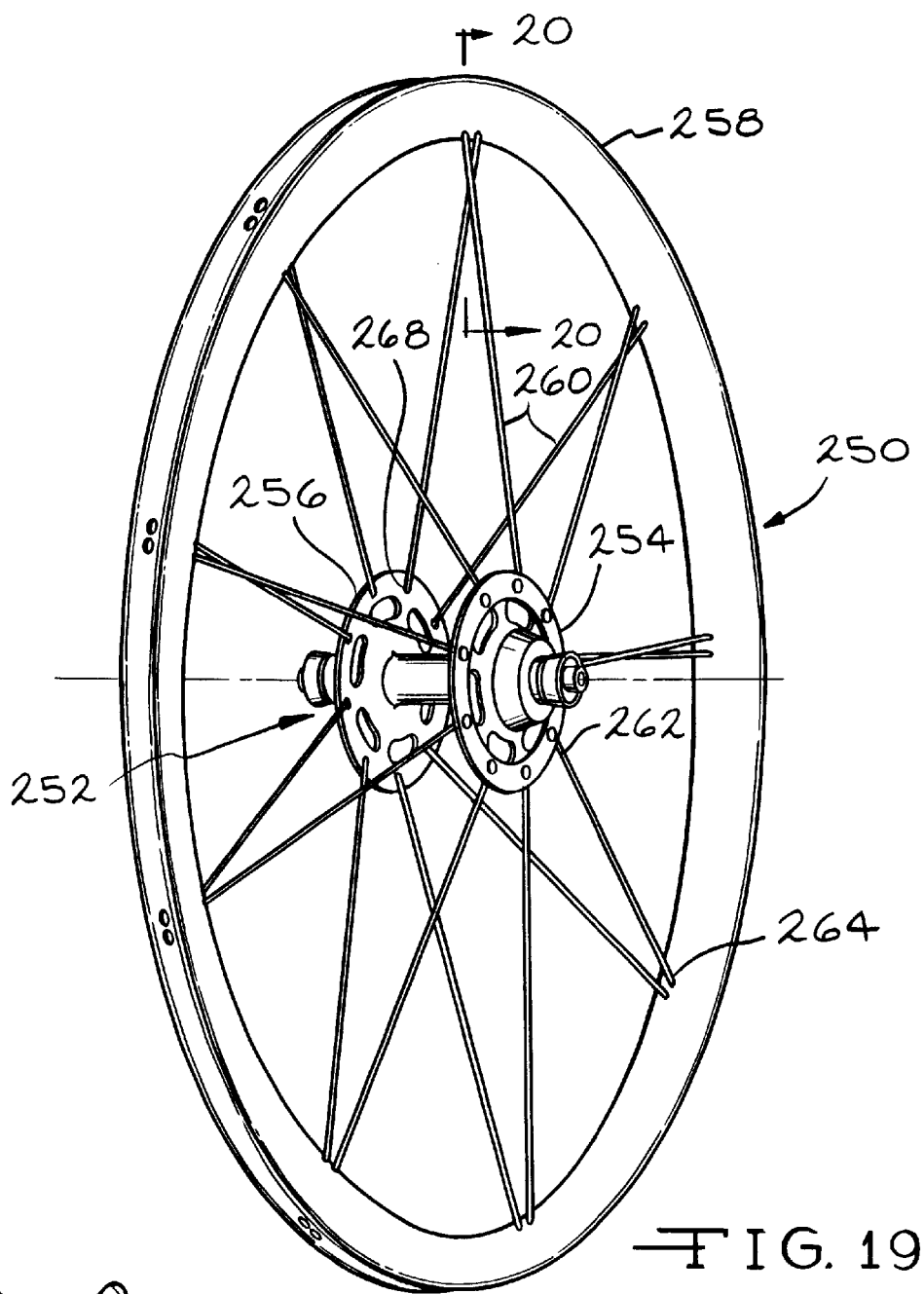
FIG. 19 is a perspective view of an eighteen spoke, radially spoked wheel showing a spoke pairing according to the present invention.
Figure 20:
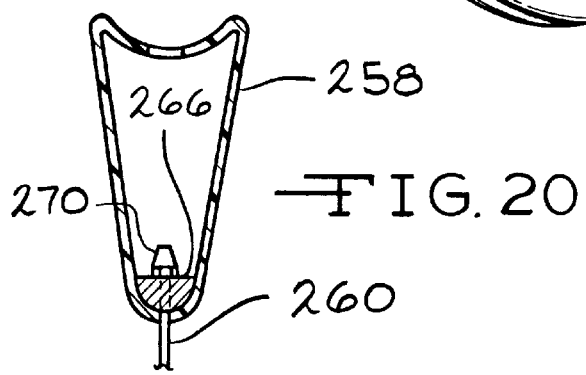
FIG. 20 is a cross-sectional view of the wheel shown in FIG. 19, taken along the line 20—20 of FIG. 19.

Referring now to FIGS. 19 and 20, a modified version of the eighteen spoke, tensioned radially spoked wheel shown in FIGS. 1 and 2 is indicated generally at 250. The wheel 250 comprises a largely conventional hub 252 with first and second opposed hub flanges 254 and 256. The wheel 250 has a rim 258 which is laced to the hub 252 with 18 conventional spokes 260, each having a first, inner end 262 and a second, outer end 264. A preferred rim is one that is commercially available under the name Zipp, including the models 340 and 440. These rims are made from a carbon fiber composite with an internal metal insert 266 (FIG. 20). The rims are light in weight and are very well adapted for the type of spoking shown in FIG. 19. Previous experience with metal rims with the exact pairing illustrated in FIG. 1 demonstrates that exact pairing of spokes at the rim can exceed the capacity of such rims.

The spokes 260 are paired in the sense that a spoke from the hub flange 254 and a spoke from the hub flange 256 are connected to the rim 258 a very short distance apart. It has been determined that the spoking pattern disclosed in FIG. 19 affords virtually the same resistance to speed wobble and shimmy as the spoking pattern disclosed in FIGS. 1 through 3, but is much easier to produce and puts far less strain on the rim and the connection between the rim and the spokes. Accordingly, in terms of wheels according to the present invention incorporating commercially available rims, the embodiment illustrated in FIGS. 19 and 20 is preferred.

Preferably, the hub flanges 254 and 256 are positioned so that spoke apertures, indicated at 268, are aligned as between the flanges 254 and 256 although it is within the scope of the invention to have slightly offset apertures in the hub flanges 254 and 256.

The outer ends 264 of the spokes 260 are connected to the rim by a conventional nipple 270, which is seated upon the metal insert 266. The outer ends 264 of a given spoke pair are offset, as discussed above, and excellent results have been obtained with wheels where the outer ends of a given spoke pair were offset by one half of an inch as well as 0.35 inches. In the case where, as shown in FIG. 20, the outer ends 264 of the spokes 19 are connected to the rim 258 in the center plane of the wheel 250, the minimum offset between ends of spokes in a pair is the minimum distance required for clearance between the nipples 270. The maximum distance, in terms of the present invention, is the distance beyond which a wheel has reduced resistance to speed wobble or shimmy by comparison with a conventionally spoked wheel having the same number of spokes.

In the embodiment illustrated in FIGS. 19 and 20, it is noted that a line defined by two spokes in a given pair intersect what has previously been defined as the wheel center plane within the confines of the rim 258.

It will be appreciated that other methods may be employed to support unpaired spokes in or immediately adjacent to the center plane of a wheel according to the presently claimed invention. The invention is concerned with a radially spoked wheel with alternating paired and unpaired spokes where none of the spokes exert a significant lateral, unresolved force on the rim. The unpaired spokes, because they are positioned in or immediately adjacent to the center plane of the wheel, exert no or virtually no lateral force on the rim. The spokes of each spoke pair exert substantially equal and opposite lateral forces on the rim, i.e., these lateral forces are resolved by the lateral forces from the other spoke in the pair. The importance and the advantages of paired spoking in a bicycle wheel are thoroughly discussed above with reference to FIGS. 1 through 12.

The foregoing description is intended to enable one skilled in the art to make and use the instant invention and not to limit it except by reference to the following claims.

What is claimed is:

1. A low spoke count bicycle wheel having a center plane and comprising:

a bicycle wheel hub for supporting the wheel relative to an axle rotatably supported therein, said hub having first and second hub flanges axially displaced from one another, said first and second hub flanges being on first and second sides, respectively, of the wheel center plane, a rim, nine or fewer pairs of first and second spokes, each of said spokes having a first end which is connected to one of said hub flanges or to said rim and a second end which is threadably received in a nipple which is seated at a spoke bore in said rim or in said hub, so that tension is applied by said first spokes between the first hub flange and a first plurality of points which are circumferentially spaced substantially evenly around the rim, and are located on the second side of the wheel center plane, and so that tension is applied by said second spokes between the second hub flange and a second plurality of points on said rim, each of which is adjacent to an adjacent one of said first plurality of points, and is located on the first side of the wheel center plane, wherein the first and second spokes of each pair have a combined static tension in excess of 200 pounds and wherein the first and second spokes of each of said pairs are connected only to the hub and the rim, and not to each other, each of said nipples being operable to adjust the tension in the one of said spokes which is threaded thereinto, independently of any adjustment to the tension in another spoke, wherein each of said pairs of first and second points on said rim are sufficiently close to each other so that, when said wheel is mounted on a bicycle, that bicycle will have improved resistance to speed shimmy or wobble or wheel induced steering inputs or axle deflection by comparison with that bicycle with a conventional wheel comprising:

a bicycle wheel hub having first and second hub flanges axially displaced from one another, each on the opposite side of the wheel center plane from the other, a rim and more than the given number of pairs of first and second spokes, each spoke having a first, end and a second, threaded end connected to one of the hub flanges and to the rim, so that tension is applied by the first spokes between the first hub flange and a first plurality of points which are circumferentially spaced substantially evenly around the rim and so that tension is applied by the second spokes between the second hub flange and a second plurality of points on the rim each of which is positioned halfway between adjacent first points.

2. The wheel claimed in claim 1 wherein the wheel comprises eight pairs of first and second spokes.

3. The wheel claimed in claim 2 wherein said spokes are oriented tangentially relative to the hub.

4. The wheel claimed in claim 1 wherein the wheel comprises six pairs of first and second spokes.

5. The wheel claimed in claim 4 wherein said spokes are oriented tangentially relative to the hub.

* * * * *

(12) INTER PARTES REEXAMINATION CERTIFICATE (0336th)
United States Patent
Dietrich

(10) Number: US 6,428,113 C1
(45) Certificate Issued: Jan. 3, 2012

(54) CYCLE AND TENSIONED SPOKED WHEEL ASSEMBLY

(75) Inventor: Rolf Dietrich, Toledo, OH (US)

(73) Assignees: Rolf Prima, Inc., Eugene, OR (US); Rolf Dietrich, Eugene, OR (US)

Reexamination Request:
No. 95/000,008, Dec. 20, 2002

Reexamination Certificate for:
Patent No.: 6,428,113
Issued: Aug. 6, 2002
Appl. No.: 09/924,790
Filed: Aug. 8, 2001

Related U.S. Application Data

(63) Continuation-in-part of application No. 09/365,957, filed on Aug. 2, 1999, now abandoned, which is a continuation of application No. 09/130,142, filed on Aug. 6, 1998, now Pat. No. 5,931,544, which is a continuation of application No. 08/893,902, filed on Jul. 11, 1997, now abandoned, which is a continuation of application No. 08/520,536, filed on Aug. 28, 1995, now abandoned, which is a continuation-in-part of application No. 08/049,504, filed on Apr. 19, 1993, now Pat. No. 5,445,439, which is a continuation-in-part of application No. 07/813,436, filed on Dec. 24, 1991, now abandoned.

(51) Int. Cl.
*B60B 1/02* (2006.01)

(52) U.S. Cl. .............................. 301/59; 301/55; 301/58

(58) Field of Classification Search ....................... None
See application file for complete search history.

(56) References Cited

To view the complete listing of prior art documents cited during the proceeding for Reexamination Control Number 95/000,008, please refer to the USPTO's public Patent Application Information Retrieval (PAIR) system under the Display References tab.

*Primary Examiner* — Peter C. English

(57) ABSTRACT

A low spoke count high spoke tension bicycle wheel having paired spokes that cross between the hub and the rim is disclosed. The wheel has a center plane and comprises a bicycle wheel hub having first and second hub flanges on first and second sides, respectively, of the wheel center plane, a rim, and nine or fewer pairs of first and second spokes each having a first end which is connected to one of said hub flanges or to said rim and a second end which is threadably received in a nipple which is seated at a spoke bore in said rim or in said hub. The wheel has excellent lateral stiffness which gives a bike on which the wheel is mounted excellent resistance to speed wobble or shimmy, in the case of a front wheel or to axle deflection, in the case of a rear wheel, and the spokes in the pair cross the wheel center plane between the hub and the rim, for added lateral strength. The first and second spokes of each pair are not connected to each other and have a combined static tension in excess of 200 pounds.

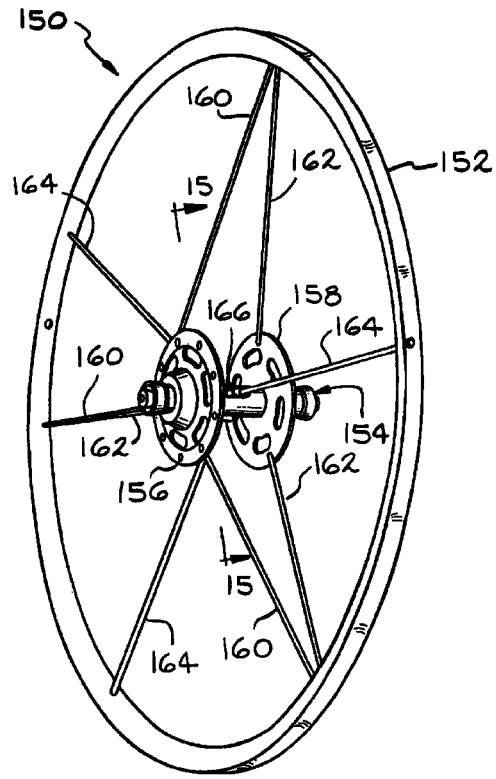

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *